United States Patent [19]
Coleman

[11] Patent Number: 5,717,756
[45] Date of Patent: Feb. 10, 1998

US005717756A

[54] SYSTEM AND METHOD FOR PROVIDING MASQUERADE PROTECTION IN A COMPUTER NETWORK USING HARDWARE AND TIMESTAMP-SPECIFIC SINGLE USE KEYS

[75] Inventor: David Allen Coleman, Austin, Tex.

[73] Assignee: International Business Machines Corporation, Armonk, N.Y.

[21] Appl. No.: 542,205

[22] Filed: Oct. 12, 1995

[51] Int. Cl.$^6$ .................................................. H04K 1/00
[52] U.S. Cl. .................................................. 380/25; 380/28
[58] Field of Search .................................. 380/25, 23, 24, 380/4, 49, 28

[56] References Cited

U.S. PATENT DOCUMENTS

| | | |
|---|---|---|
| 5,136,643 | 8/1992 | Fischer . |
| 5,313,521 | 5/1994 | Torii et al. . |
| 5,319,710 | 6/1994 | Atalla et al. . |
| 5,337,357 | 8/1994 | Chou et al. . |
| 5,349,642 | 9/1994 | Kingdon . |
| 5,349,643 | 9/1994 | Cox et al. . |
| 5,351,293 | 9/1994 | Michener et al. . |
| 5,351,295 | 9/1994 | Perlman et al. . |
| 5,371,794 | 12/1994 | Diffie et al. . |

FOREIGN PATENT DOCUMENTS

| | | |
|---|---|---|
| 2 238 636A | 6/1991 | United Kingdom . |

OTHER PUBLICATIONS

"Kerberos: An Authentication Service for Computer Networks", C. Neuman et al, IEEE Communications Magazine, vol. 32, No. 9, Sep. 1994, ISSN 0163-6804, pp. 33–38.

"The S/Key One-Time Password System", N. M. Haller, ISOC Symposium on Network and Systems Security, Jan. 1, 1994, pp. 151–157.

*Primary Examiner*—David C. Cain
*Attorney, Agent, or Firm*—Robert M. Carwell

[57] ABSTRACT

An authentication session key is generated on a trusted machine based upon an identifier of its CPU, hardware configuration, and a timestamp. The trusting machine retrieves this same information about the trusted machine, and then generates session locks for the machine which are valid for a predetermined time interval. If the incoming session key matches one of the session locks, and the incoming session key is not on the list of used keys, the session key is appended to a list of keys which will no longer thereafter be valid, and access is then granted, thereby employing single-use keys. Because the locks and keys are also generated during a timestamp, a user may request service from the same machine multiple times by waiting no more than a predetermined time between requests, or front ends to the masquerade protection tools could be written that re-try until successful. Because the keys generated are specific to the hardware characteristics of the trusted machine upon which they are generated, attempts to gain access from an imposter machine will generate unusable session keys.

18 Claims, 13 Drawing Sheets

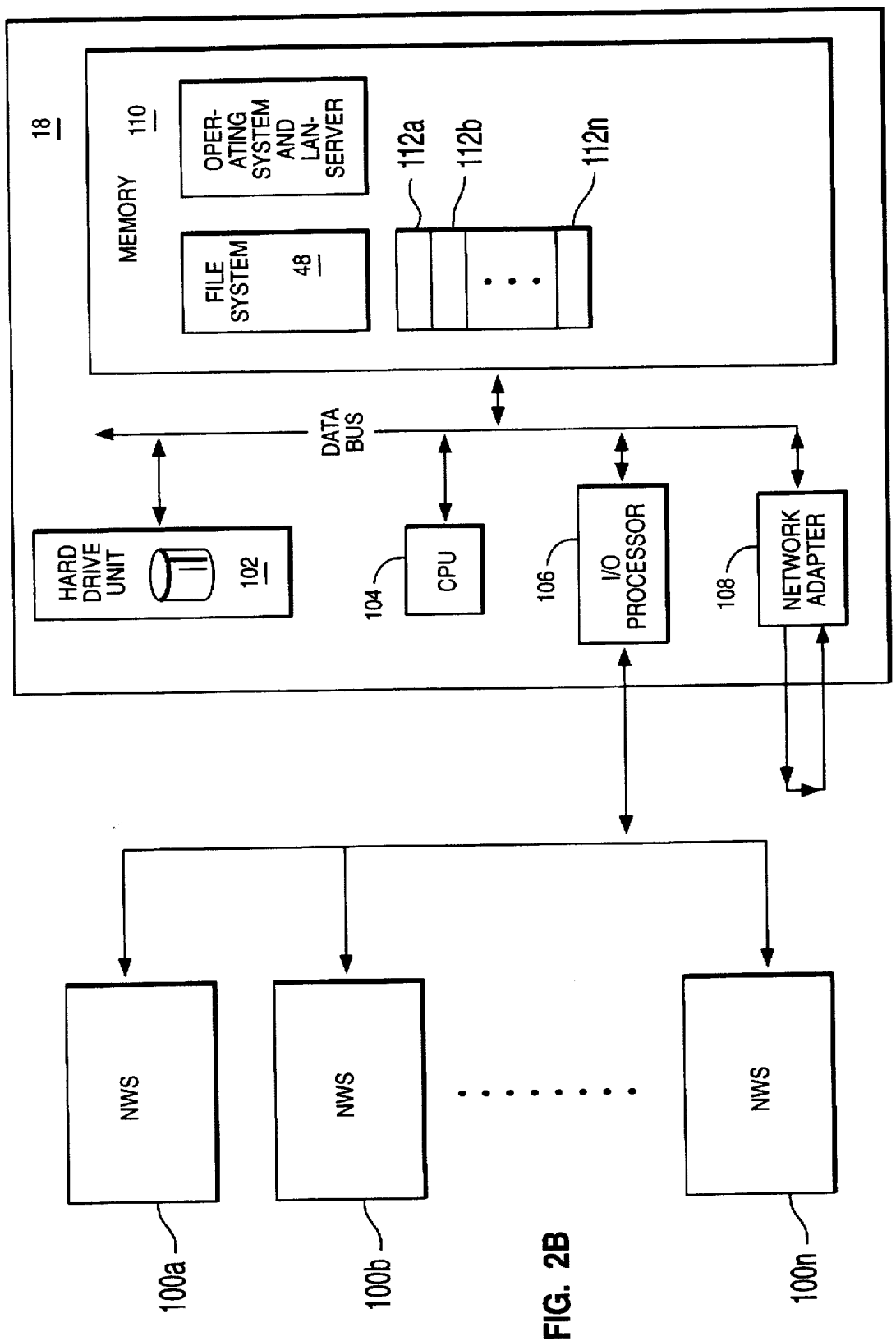

SYSTEM AND METHOD FOR PROVIDING MASQUERADE PROTECTION IN A COMPUTER NETWORK USING HARDWARE AND TIMESTAMP-SPECIFIC SINGLE USE KEYS

TECHNICAL FIELD

This invention relates to security in computer network systems and, more particularly, to systems and methods for authenticating users and their machines so as to prevent masquerading attacks.

BACKGROUND OF THE INVENTION

Recent developments in computer science are now more effectively exploiting the potential power afforded by computer networks. More particularly, developments in distributed computing, multi-processor technology, remote file system access, and the like, have significantly increased the productivity, utility and power of such networks. Recently, powerful tools have been developed utilizing the processing power of multiple machines to effect these improvements. For example, systems based on the UNIX (trademark of the Novell Corporation) operating system conventionally provide for commands such as rlogin, rsh, and mount of a remote file system which, respectively, permit a user at one machine to log onto a remote machine, to remotely execute commands and mount a remote file system located on one or more machines physically separated on the network from the machine the particular user is employing.

However, in such systems wherein a user may have access to multiple machines, serious problems have arisen with respect to security and authorizing use. One approach to addressing these problems is to simply provide a user with specific passwords associated with each machine on the network for which the user desires access. However, forcing a user to always type a password for each machine may become unworkable and unacceptable in many cases this is particularly true if, for instance, a user needs to distribute a task among several machines (which is becoming fairly commonplace in modern day computer technology).

Historically, this problem has been alleviated to some degree with various techniques having their own limitations, such as providing a trusting machine with an .rhosts file, in the UNIX environment, for example, which includes the user name and hostname of the trusted user employing the machine to be trusted.

Using such techniques as rlogin, rsh, and mount of a remote file system provides powerful functionality but, unfortunately, also renders such network system vulnerable to attacks on the system employing a method known as "masquerading". Masquerading occurs when the attacker brings a machine onto a network with a network or internet protocol address of a "trusted" machine. Then, by becoming a certain user on the attacking machine known to the receiving machine, the attacker may thereby gain access to the "trusting" machine by masquerading as this user. The trusting machine thereby believes that the attacker is requesting access from the trusted user on a trusted machine.

Accordingly, from the foregoing, it will be readily apparent that a serious problem was presented in finding a way for one machine on a network to verify that any request from a trusted machine in fact was really originating from the trusted machine and that the request was thus not being provided by a clever imposter.

Solving these serious security problems has commanded a great of deal of attention in the computer field due to the potential for great damage both in terms of property value and safety should these networks be compromised. It is unfortunately becoming almost commonplace to hear reports of networks being broken into at great loss of security, privacy, data integrity and the like, and when such systems relate to international banking, national security, flight control, medical records, and so on, the seriousness of the problem can be readily appreciated.

Thus, the industry has a long history of developing techniques involving keys, such as those employing timestamps, encryption, and various forms of authentication in an effort to render networks more immune to attacks, but nevertheless regrettably the problem remains. As but one example representative of the extensive amount of work being done on the authentication problem, a security system known as Kerberos has been developed principally at the Massachusetts Institute of Technology. However, even such a sophisticated system is vulnerable to network "sniffers" which may intercept a key or password, and then be utilized by the unauthorized interloper to gain access to the network.

As to the technique of providing keys, as general background this technology may be seen represented in U.S. Pat. No. 5,136,643 which utilizes public/private key pair technology to authenticate timestamps. Similarly, U.S. Pat. 5,313,521 employs public/private key pair technology to safely exchange standard private keys. In like manner, U.S. Pat. No. 5,371,794 also utilizes this public/private key pair technology to encrypt/decrypt wireless communications. However, for various reasons, all of these systems are still nevertheless subject to several weaknesses to be hereinafter detailed.

Also by way of background, one other approach in the art has been to simply, in brute force, encrypt the data being transmitted back and forth between stations. Representative examples of this technology include U.S. Pat. No. 5,319,710 on encryption, decryption of transmitted transaction data, and U.S. Pat. No. 5,349,642 which authenticates a message by encrypting it at the sender and decrypting at the receiver. One obvious disadvantage of such systems is that the actual data itself must be encrypted and decrypted, with associated delays in processing, and the like.

Yet another species of solutions seeking to render networks more secure involves the concept of timestamps. This technique may be seen represented in U.S. Pat. No. 5,351,293, which utilizes a timestamp for initial validation, whereupon again the data is then encrypted. U.S. Pat. No. 5,351,293 also uses the concept in metering transmission of encrypted data but does not approach the problem in the manner of the present invention in addressing initial authentication. One perhaps more relevant approach in the prior art may be seen disclosed in U.S. Pat. No. 5,351,295 which does attempt to prevent some form of impersonation or masquerading and replay attacks. However, as will become readily apparent from the detailed disclosure of the invention, this system does not protect one neighbor from another. In other words, one trusted neighboring user may have all the information necessary to impersonate another trusted neighbor user. This is so because no secret key is provided for a specific user/machine which includes specific hardware configuration data for such authentication. Moreover, the system disclosed in U.S. Pat. No. 5,351,295, as noted, does not prevent replay attacks in a situation where a perpetrator may manipulate the system clock to thereby thwart timestamping.

SUMMARY OF THE INVENTION

It is therefore one object of the present invention to provide an improved system and method for preventing masquerading in a computerized network.

It is another object of the present invention to provide for additional authentication employing specific data in the authentication scheme related to the particular machine and time.

It is yet another object of the present invention to provide for such improved network security without necessity to employ data encryption.

It is another object of the present invention to provide for masquerade protection which renders exhaustive system attacks impractical.

It is a further object of the invention to provide for improved network security which is immune to replay attacks by a system administrator such as those wherein a system clock is manipulated.

It is another object of the present invention to provide a system to protect against computer network masquerading attacks which accounts for lack of perfect synchronization of system clocks, and for machines being located in differing time zones.

It is another object of the invention to provide for masquerade protection against imposters inside a subnet attempting to access machines within the subnet by utilizing the same network or internet protocol address as a legitimate machine.

It is still a further object of the invention to provide for such masquerade protection while at the same time allowing for access to the network by intermediate machines using conventional multiple access technology such as rlogin, rsh, and mount of a remote file system.

In accordance with the teachings of the invention, an additional authentication step is provided beyond the normal conventional hostname or network address of the incoming machine and the user name of that machine. In a particular embodiment, this additional authentication, transmitted by altered versions of rsh, rlogin and mount, is received and verified by alternate versions of rshd, login and rpc.mountd on the trusting machine providing the service. The additional authentication, herein referred to as a "session key", is generated on the trusted machine based upon a unique identifier of its CPU, hardware configuration, and a timestamp. The trusting machine receiving the request checks a table to determine the hardware information of the incoming machine (e.g., CPU-id, hardware configuration, etc.), and then generates session locks for that particular machine only. In the preferred embodiment, these locks are valid for a predetermined time interval such as from time (−5 minutes) to time (+5 minutes).

If the incoming session key matches one of the session locks, the session key is then appended to a list of keys which will no longer thereafter be valid, and access is granted. This system thereby employs, as an important feature of the invention, the concept of single use keys. Because the locks and keys are also generated during a timestamp, a user may request service from the same machine multiple times, by waiting no more than a predetermined time such as 60 seconds in the preferred embodiment, between requests. It is a further important feature of the invention that any attempt to gain access from an imposter machine will generate completely unusable session keys, as keys are generated partly as a function of information specific to the particular hardware characteristics of the machine upon which the keys are generated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying figures, wherein:

FIG. 2B depicts a block diagram of a mainframe computer from FIG. 1 for implementing the system and method of the present invention;

DETAILED DESCRIPTION OF THE PREFERRED EMBODIMENT

In order to understand application of the invention to computer networks, a description will first be provided of a representative such computer network wherein the invention may be advantageously employed to effect the desired protection against masquerade attacks on the security of the network. It will be readily appreciated that the invention admits to applicability to any embodiment of a computer network and thus is not intended to be so limited to the particular illustrative network hereinafter described.

Figure 1:
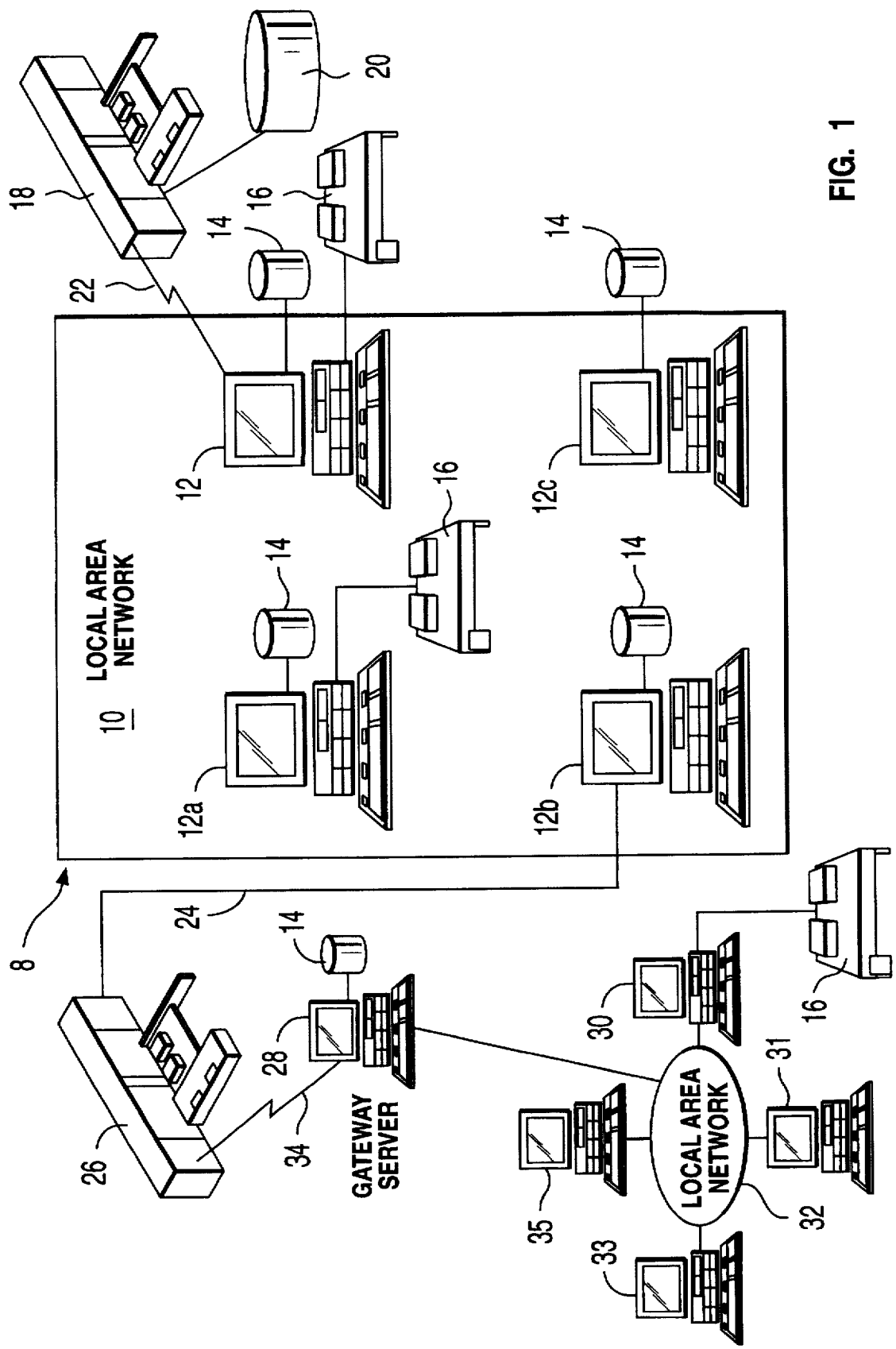
FIG. 1 is a pictorial representation of a data processing system which may be utilized to implement the system and method of the present invention.

With reference now to the figures, and in particular with reference to FIG. 1, there is depicted a pictorial representation of a data processing system 8 which may be utilized to implement a method and system of the present invention. As may be seen, data processing system 8 may include a plurality of networks, such as local area networks (LAN) 10 and 32, each of which preferably includes a plurality of individual computers 12, 12a–12c, 30, 31, 33 and 35. (Hereafter, when discussing a computer in network 32, a computer 30 will be arbitrarily referenced, although the discussion could relate to any of the computers in network 32). Computers 12 and 30 may be implemented utilizing any suitable computer such as the IBM Personal System/2 (also called a "PS/2") computer or an IBM RISC SYSTEM/6000 computer, both product of International Business Machines corporation, located in Armonk, N.Y. "RISC SYSTEM/6000" is a trademark of International Business Machines Corporation, "Personal System/2" and "PS/2" are registered trademarks of International Business Machines Corporation. Of course, those skilled in the art will appreciate that a plurality of intelligent work stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store objects, such as documents, resource objects, or executable code, which may be periodically accessed by any user within data processing system 8. In a manner well known in the prior art, each such object stored within a storage device 14 may be freely interchanged throughout data processing system 8 by transferring an object to a user at an individual computer 12 or 30, for example.

Still referring to FIG. 1, it may be seen that data processing system 8 also may include multiple mainframe computers, such as mainframe computer 18, which may be preferably coupled to LAN 10 by means of communications link 22. Mainframe computer 18 may be implemented utilizing an Enterprise Systems Architecture/370 (also called an "ESA/370") or an Enterprise Systems Architecture/390 (also called an "ESA/390") computer available from IBM. Depending on the application a mid-range computer, such as an Application System/400 (also called an "AS/400"), may be employed. "Enterprise Systems Architecture/370", "ESA/370", "Enterprise Systems Architecture/370", and "ESA/390" are trademarks of IBM; "Application System/400" and "AS/400" are registered trademarks of IBM; "Application System/400" and "AS/400" are registered trademarks of IBM. Mainframe computer 18 also may be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

As discussed above with respect to LAN 32 and LAN 10, objects may be stored within storage device 20 and controlled by mainframe computer 18, as Resource Manager or File System Manager for the stored objects. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within Texas and mainframe computer 18 may be located in New York.

Figure 2A:
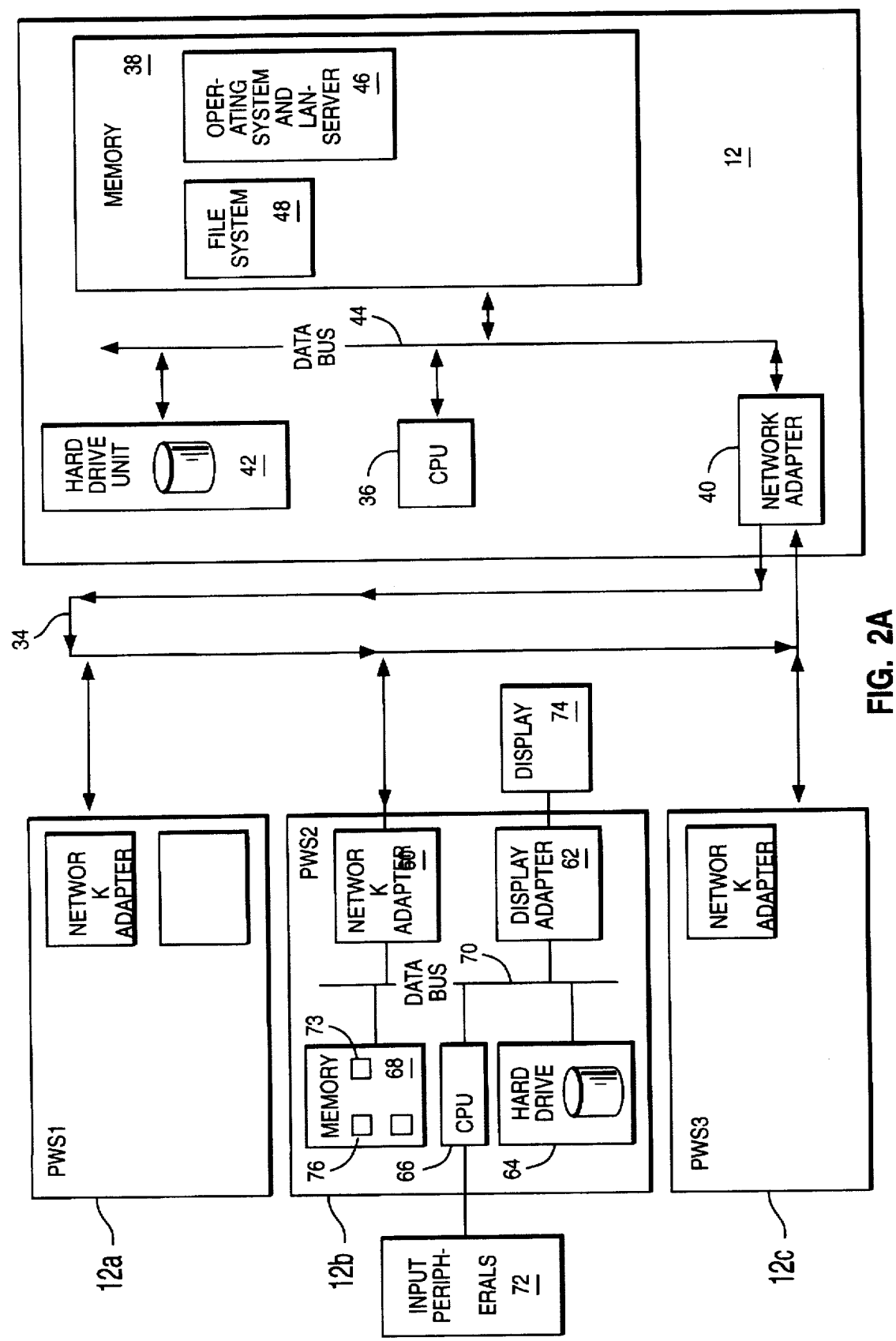
FIG. 2A depicts a block diagram of a local area network from the data processing system illustrated in FIG. 1 for implementing the system and method of the present invention, and which may benefit from the masquerade protection technique of the present invention.

A preferred embodiment of the present invention may be incorporated within various computers depicted within data processing system 8. Referring now to FIG. 2A, a block diagram of LAN 10 is depicted for implementing a method and system of the present invention. Server 12 communicates with computer 12a–12c over communications channel 34. LAN 10 is depicted in a token ring geometry, however, other geometries are possible. Server 12 may be a conventional computer, such as an IBM PS/2 or AS/400 system programmed to practice this invention. Server 12 includes a central processing unit (CPU) 35, a memory 38, and a network adapter 40. Network adapter 40 is utilized for formatting outgoing transmissions and for deformatting incoming transmissions. Server 12 also includes a hard drive unit 42 for storing various objects, such as data files or executable code. Objects may be accessed by one or more users, wherein an object may be transferred to computer memory 38 over data bus 44. A number of objects may exist within memory 38. An operating system and local are network server 46 are represented as one object within memory 38.

Various users may access objects by sending a request to a file system which is conventionally resident on hard drive 42 in server 12 utilizing computers 12a–12c. A "file system" is a collection of files and file management structures that may be located on the physical or logical mass storage device (or even memory 38). Computer 12b is a typical example. Computer 12b operates as a personal work station communicating with server 12. Schematically, computer 12b is substantially similar to server 12, and includes a network adapter 60, a display adapter 62, a hard drive unit 64, a central processing unit (CPU) 66, and addressable memory 68. Components of computer 12b transfer data over data bus 70. CPU 66 directly controls input peripherals 72, which may include a keyboard and a mouse. Display adapter 62 drives display device 74. Memory 68 includes part or all of an operating system 73 which also is conventionally resident in the mass storage device such as hard drive 64. Memory 68 also includes object 76, which was supplied by computer 12 in response to a request to computer 12.

Referring now to FIG. 2B, a block diagram of mainframe computer 18 is depicted in accordance with a preferred embodiment of the present invention. Mainframe computer 18 is a single computer system running multiple processes, such as an IBM ESA/370 or ESA/390 attached to multiple nonprogrammable work stations (NWS) 100a–100n. Mainframe computer 18 includes a hard drive unit 102, CPU 104, input/output (I/O) processor 106 for communicating with nonprogrammable work stations 100a–100n, network adapter 108, and memory 110. Hard drive unit 102 may store objects. Each nonprogrammable work station may access an object within memory 110 or hard drive unit 102. For example, nonprogrammable work station 100a would access object 112a, nonprogrammable work station 100b would access object 112b, and nonprogrammable work station 100n would access object 112n in accordance with a preferred embodiment of the present invention.

An "object" is any real resource that has an ACL associated with it. In the depicted example, an "object" corresponds to a subdirectory or a file in a hierarchical file system. The "attributes" of an object are represented in an access control list (ACL). A "container object" is an entity that may contain zero or more objects or container objects. In the depicted example, a container corresponds to a directory in a hierarchical file system.

Figure 3A:
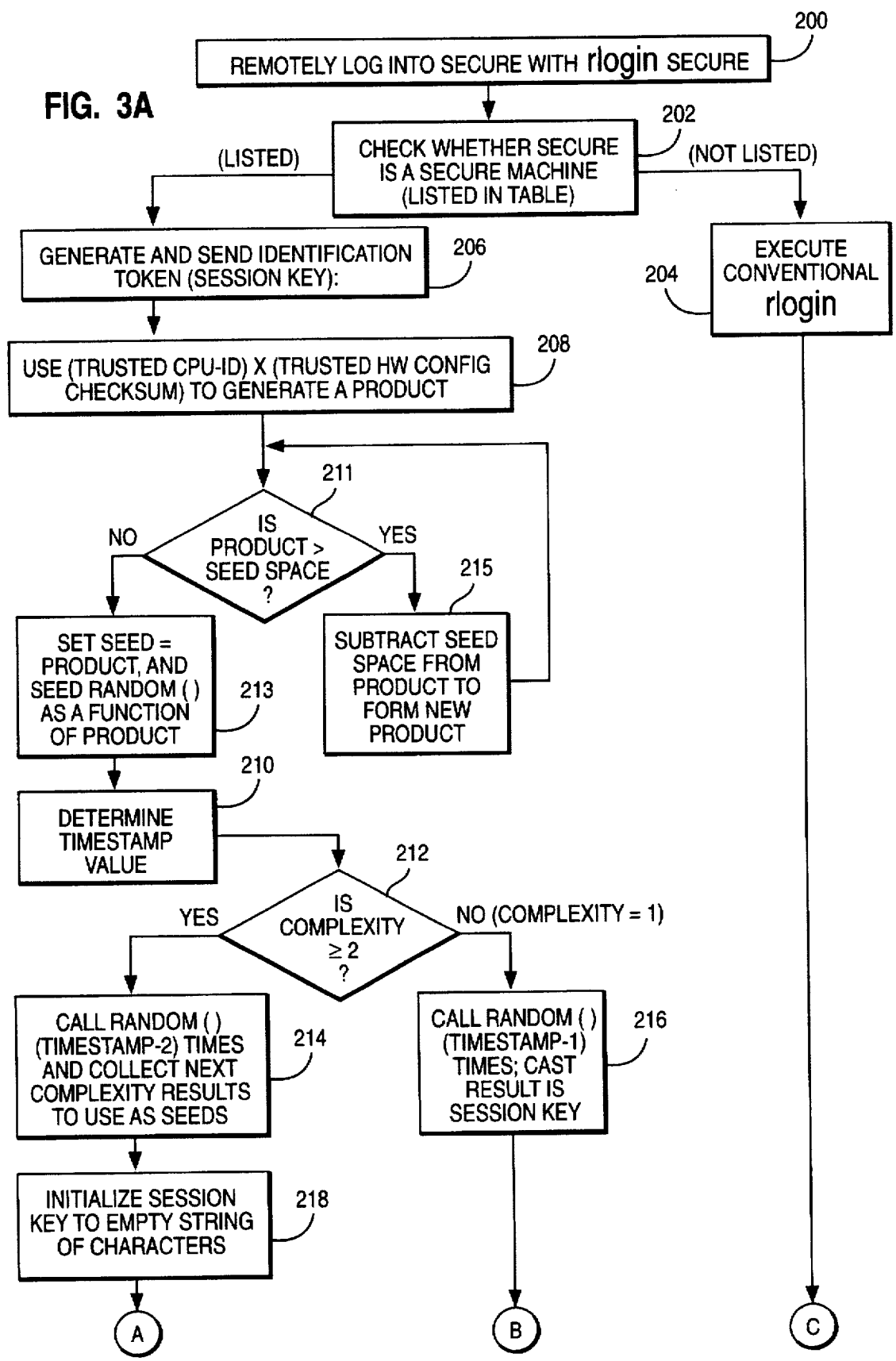
FIG. 3A is a flow diagram illustrating the system and method of the invention, and more particularly, illustrating a specific example of a user on a trusted machine remotely logging into a secured machine with rlogin.
Figure 3B:
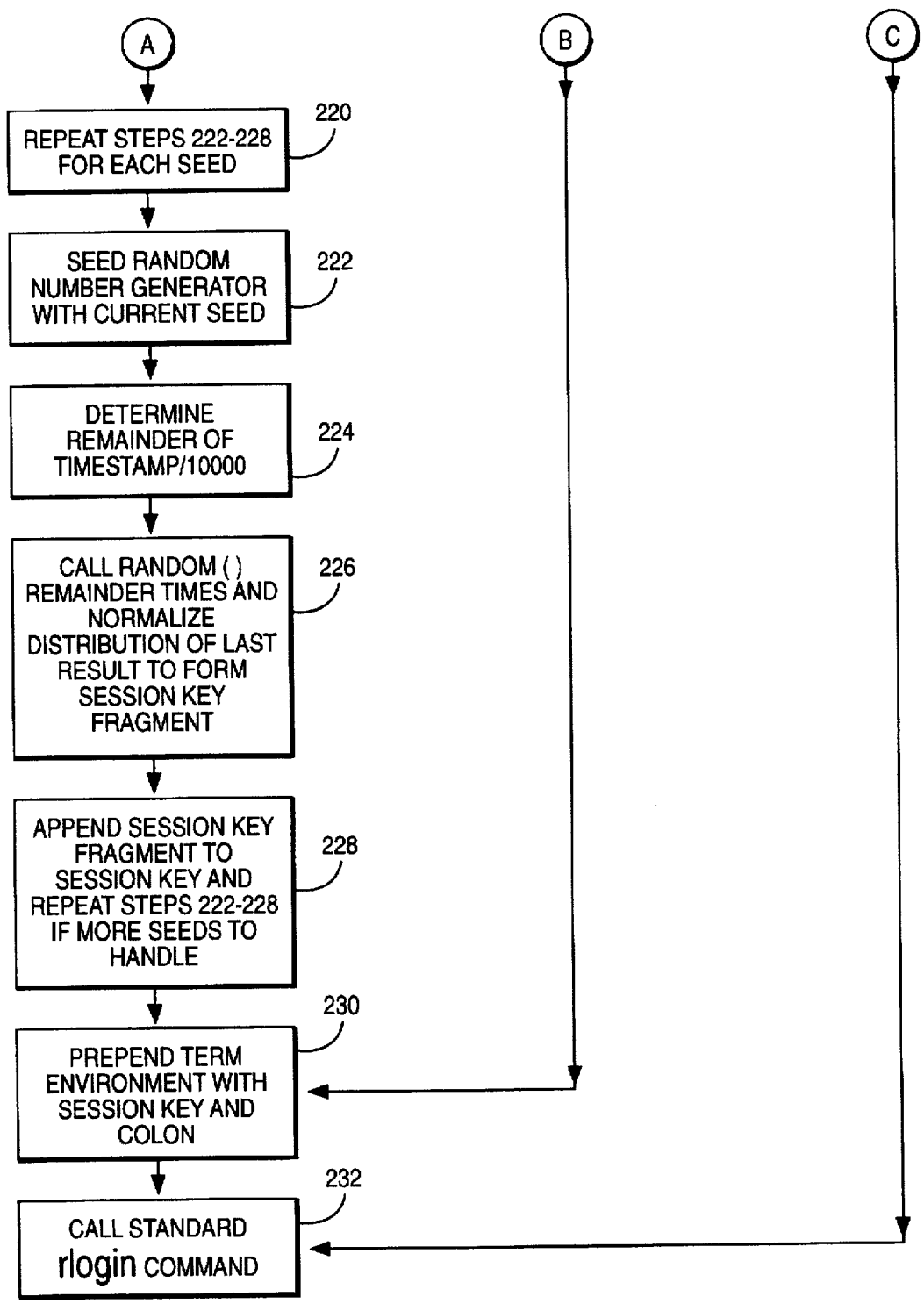
FIG. 3B is a continuation of the drawing of FIG. 3A.

Now that a general background of computer networks has been provided in which the invention may be advantageously employed, an overall description of a particular embodiment of the invention will be provided. This will be followed by a more particular description of the invention by way of the flow diagram of FIGS. 3A–3B, illustrating a specific instance of the masquerade protection scheme. This, in turn, will be followed by a more detailed description of the unique hardware-specific information employed as an important part of the invention in ensuring against exhaustive attacks.

One characteristic of machines running in a typical computer network is that it is possible to generate a relatively unique indicator associated with the particular machine which, in the embodiment described herein, includes an identification of the machine's CPU and other hardware. It will be appreciated that it is a matter of choice as to how detailed and unique this machine-specific data is, and the invention is not intended to be limited to the particular method of generating a machine-specific indicator as herein set forth.

However, in the embodiment disclosed, it is assumed that the machine is running in a UNIX environment and will have a CPU-id and a hardware configuration unique to that particular machine. In accordance with conventional UNIX, combinations of commands may be issued such as "uname –m | cut –c3–8" which, upon execution, will reveal the particular CPU-id number of the machine on which the command is executed. In like manner, a combination of other well known commands in the AIX operating system may be issued "lscfg –v | sum –r" which will, upon execution, yield two numbers, the first of which will be the machine's hardware configuration checksum. This checksum will be a number indicative of various hardware aspects of the particular machine for which the command is executed, such as the adapter cards installed, the amount and type of DASD, etc. and will thus provide a "fingerprint" specific to the machine. It will be appreciated that different operating systems may have other implementations of this functionality (such as "qconfig") with respect to dos) which will facilitate arriving at such a machine-specific fingerprint. Although the particular machine characteristics accounted for may differ and be a matter of choice, as desired, the key point is that a number is generated specific to the hardware of the machine generating the number. In the implementation this is accomplished by use of the CPU-id and hardware checksum. While these numbers, and therefore the resultant product may not necessarily be absolutely unique to the machine from which they are derived (e.g., given enough machines, another machine may yield on identical product however unlikely, the point is that a number specific to a particular machine may be generated to any desired degree of "uniqueness" to that machine. This number, in turn and as will be seen, will have a bearing on the degree of masquerade protection provided. Thus the implementer of the invention may control the desired level of protection by the manner in which the numbers are generated,e.g., how "unique" they are to one and only one machine.

In accordance with the invention, a session key to be sent from a trusted machine to a trusting or "secure" machine is thereby formed by the trusted machine being utilized by the user, such session key being formulated in several steps which include this hardware-specific number.

First, a function "srandom((CPUID)*(Hardware Configuration Checksum))" is called to seed the machine's random number generator with hardware-specific information.

Next, at the user's machine, a next function "gettimeofday" is called to set a value for "t" seconds (tsecs) seconds past an arbitrarily chosen time such as midnight, Jan. 1, 1970. It will be noted that more generically speaking, this function will simply return a value which can be associated with the particular time at which the command is issued.

Next, a function "timestamp" is then called which will set a parameter to "(tsecs/key_change_Δ)+arbitrary_constant", where "key_change_Δ" is the number of seconds desired between key changes, and "arbitrary_constant" is an arbitrary constant selected to be the same and known both on the sending trusted and receiving trusting machines.

Next, a "session_key" parameter is set to "random()" which, after looping "timestamp" times, will return a random number. In the implementation being described, this number will range from 1 to 2,147,483,647,although again it will be readily appreciated that the range of this random number may be preselected to any desired number. In accordance with the preferred embodiment thus, if the timestamp is 57 million, then the trusted machine will seed its random number generator with hardware information unique to itself, and set the session key to the 57 millionth random number thereby calculated by this step. It is important to note that this is a one-way hash function, inasmuch as it is impossible to calculate the seed from the result of a random function.

It is helpful at this point in understanding the entire concept of the invention to think of it in physical terms as each trusted machine having its own unique lock wheel where only a preselected number of locks out of the aforementioned possibility of 2,147,483,647 are valid at any one given time, where the wheel rotates a lock in and a lock out of the valid range every "keychange delta" seconds, and wherein the wheel is totally different for each different machine. In the preferred embodiment under discussion, only 11 locks out of the 2,147,483,647 are valid and the wheel will rotate the lock into and out of the valid range every 60 seconds, although, in like manner to the magnitude of the random number, these values may be selected as desired and for purposes to be hereinafter described.

The lock wheel, with its 2,147,483,647 locks (each of which is different for every trusted machine) rotates counter-clockwise every 60 seconds, bringing one new lock into the valid range of 11 locks, and moving one old lock out of the valid range of 11 locks.

It will be recalled that because of the foregoing mechanism, only a predetermined number of locks (such as 11 in the embodiment) will be valid for any particular time, and the wheel will hold enough locks for a substantial period of time (4,083 years in the embodiment under discussion).

The trusting machine having masquerade protection of the present invention will then obtain the hardware information for the incoming trusted machine from a lookup table, which has previously stored in it, this data (including the CPU-id, hardware configuration checksum, or any other number as desired uniquely associated with the particular trusted machine, and further including a "key change delta" seconds value and an arbitrary constant). The trusting machine will then formulate a predetermined number of locks for that incoming trusted machine only. In the embodiment under discussion, this predetermined number will be 11 locks-one for each minute from 5 minutes prior to the present to 5 minutes into the future. If the incoming session key has not yet been used as determined by the trusting machine, and if it fits one of the previously described 11 locks for that incoming machine only, then this incoming key is added to a "used key" list, and access is granted to the trusted machine. It will be noted that the two machines' clocks must be synchronized to be identical to within the predetermined time range, e.g., in the implementation being described within +–5 minutes.

From the foregoing high level description, many advantages of the present invention may be readily apparent over the approaches taken by the prior art. First, the solution to the problem provided by the invention is based upon a function unique to the trusting and trusted machines—such function being based upon the trusted machines CPU-id, and hardware configuration, and is further based upon time. This approach makes it possible to change keys by simply changing hardware configurations slightly (for example if it is thought that the hardware-specific data has been compromised). Yet, it is nearly impossible for an imposter attacker to generate another machine with the same hardware characteristics. This also makes an exhaustive attack impractical, as every new attempt would require some change to the hardware configuration. Moreover, this single-use key concept (implemented by adding a key to a used key list precluding its subsequent use beyond the predetermined time interval) protects the system against an attacker employing a network sniffer. Even though the attacker may be able to surreptitiously view the session key as a user is granted service, the session key thereby seen by the attacker has already been rendered useless on the machine granting service.

Still further advantages of the present system over those provided by prior art may be appreciated. The invention addresses the problem of vulnerability to an imposter on the same subnet using the same address as a truly trusted machine. Prior art solutions typically have only protected against such imposters outside a subnet trying to appear to be a machine within the subnet.

Yet another problem addressed by the invention is that potentially, with respect to authorization schemes, tools utilized to generate the keys may be reverse engineered to reveal the operative algorithm. In such a case, an attacker may write software to exhaustively search all keys without needing to change the hardware configuration between attempts which would otherwise be necessary if such a system were devised which brought unique hardware into play. The keys generated by the present invention are based also partly upon time of day, such that no key is valid longer than a predetermined time (such as 10 minutes in the embodiment herein described). It will be further readily apparent that trying all keys (over 2 billion in the implementation) would require someone to try over 3 million keys per second, as any slower attack rate simply could not keep up with the key changes. Thus, by invalidating keys after a predetermined period and adding keys to a "used key list", this prevents an imposter from attempting to intercept a key or password off the network and immediately use it, as keys are flagged as no longer valid to prevent someone from "walking in" behind a bona fide user.

In the background of the invention, conventional application of public/private key pair technology was discussed wherein safe exchange of standard private keys is made to authenticate timestamps, safely exchanged standard private keys, and the like. However, although the present invention does utilize timestamps, they are not employed in the conventional sense, nor does the invention use public/private key pairs. On the contrary, the invention utilizes a user-configurable method of using a timestamp as an encryption key which is only used to encrypt an authentication token. Some of the keys are configurable, and some depend uniquely upon the hardware.

Still further, as previously set forth in the background of the invention, conventional encryption/decryption technology is inapposite to the invention which does not encrypt data but rather authenticates a sender and does not transmit encrypted data of necessity after the initial authentication.

The present invention provides for a unique secret key and uses hardware configuration for authentication, thereby preventing replay attacks in a situation where a perpetrator can manipulate a system clock. Once a key is utilized, it is added to a "never use again" list such that even if a clock is in fact manipulated, a duplicate key is always disallowed such that the system is immune to replay attacks by those who might manipulate the system clock. Unlike prior systems, the present invention uses its methods at the endpoints of an n-machine network path employing unique key spaces (a key space of 10 to the 45th power in the disclosed embodiment). Moreover the invention can be utilized even if an intermediate machine does not utilize the system without crippling the intermediate machine's use in the network.

Still further, by providing for the predetermined time space wherein a key may be employed, the invention accounts for different computers on the network being in different time zones or not synched to precisely the same time.

Turning now to FIG. 3A, from the foregoing it will be understood that the masquerade protection scheme of the present invention operates by the conditional creation and verification of identification tokens added to the conventional rlogin, rsh, and mount interfaces. In FIGS. 3A and 3B, an example of the steps in using the invention are shown for an rlogin. In the example, it will be assumed that a user on a trusted machine such as machine 12B of FIG. 1 desires to remotely log into a secure or trusting machine such as machine 12A in FIG. 1 wherein the masquerade protection of the invention is implemented with respect to the machines 12A and 12B. For simplicity, with respect to FIGS. 3A-3B, this trusted machine will simply be referred to as TRUSTED, and the secure machine as SECURE. First, as indicated at block 200 and as just noted, a user on TRUSTED is desirous of remotely logging into SECURE. Accordingly, the user would first type "rlogin SECURE". Note that this is a conventional login command which would be employed regardless of whether the user was logging into a machine with masquerade protection or not, thereby indicating the invention may be implemented in systems including machines wherein the masquerade protection is not implemented or required.

Executing the command, 200, thereafter will invoke a modified version of rlogin which will check a directory such as/etc/hosts. SECURE, thereby either executing a check to see if SECURE has masquerade protection tools which will be ready to validate a session key. If the SECURE machine is not listed in the directory, this indicates that a normal or conventional rlogin procedure is required, 204. Thus, the standard (e.g., unmodified) rlogin command is executed, 232.

Assuming secure is listed within the directory, an identification token, e.g., session key, will be generated and sent, 206, as follows. A checksum will be run on TRUSTED's hardware configuration which will then be multiplied by TRUSTED's CPU-id to obtain a seed, which is then utilized to seed a random number generator, 208-213. More particularly, a product will be formed from the TRUSTED CPU-id multiplied by the hardware configuration checksum, 208. This product should be within the seed space inasmuch as it will be utilized to seed the random() generator. However, it will be appreciated that in some systems it is possible that this product would exceed the seed space if the maximum CPU-id and/or hardware checksum were too large. Accordingly, a process must be provided for devising this and ensuring the product is in fact within the seed space. Accordingly, per block 211, a check is made to determine if the product of block 208 is greater than the seed space. If not (which is the more probably result), this product becomes the seed which is then utilized to seed the random number generator, 213. If, on the other hand, the product of block 208 is greater than the seed space, in a preferred embodiment, the seed space is subtracted from this product to form a new product, 215, and the result is looped back to the decision block 211 to determine if this new product is greater than the seed space. The immediately preceding process 211-213 is iterated until at some point the product is not greater than the seed space, in which case, as previously described, one of these new products becomes the seed utilized to seed the random number generator, 213. Next, a timestamp value will be determined. This may be effected by calling a gettimeofday() or similar function. This will produce a time corresponding to the time the routine was called (which conventionally is reckoned in the number of seconds subsequent to Jan. 1, 1970). This value is divided by a constant GCON and then another constant ACON is added to this result to obtain the desired timestamp value, 210. It will be noted that this modified version of rlogin, which is executable by any user but only readable by a user with root authority, will preferably have compiled within it these GCON and ACON constants, as well as a COMPLEXITY constant for purposes which will hereinafter be made clear, all such constants being selected by the system administrator of TRUSTED.

Next, as shown by decision block 212, a determination will be made if the preselected complexity constant is equal to or greater than 2. At this point it will be sufficient merely to note that this COMPLEXITY constant is selected to indicate the desired extensiveness of the masquerade protection. If a higher complexity number is selected, as will be hereinafter described in greater detail, this will effectively cause an iterative process to transpire, generating key fragments related to the particular COMPLEXITY constant selected. These key fragments will be concatenated to generate a session key. It will thus be appreciated that essentially selecting a higher complexity number will result in a larger session key with more numerals, thereby making it more difficult to attack a system and generate such a session key. If it is determined that the COMPLEXITY constant is equal to 1,as indicated by the branching from the decision block 212 to the right, the pseudo random number generator function random() will be called repeatedly. Specifically, the random function will be called (timestamp −1) times, e.g., the value of (timestamp determined at step 210 −1) times. At the last such call of random, the result thereof will be defined as the session key, 216. At step 230, the TERM environment will then be prepended with this session key and a colon (step 230) after which the standard rlogin command will be executed, 232 (FIG. 3B).

Returning back to block 212 of FIG. 3A, if it is determined that the COMPLEXITY constant is equal to or greater than 2,again the random() function will be called, but this time will be called the timestamp value (determined at block 210) −2 number of times, and the next COMPLEXITY results will then be collected to be used as seeds to be hereinafter described, 214. Next, shown as step 218, a session key will be initialized to an empty string of characters, 218.

Continuing with FIG. 3B, with respect to every seed generated at block 214, as shown at block 220, the following steps 222-228 will be executed. First, a pseudo random number generator will be seeded with the current seed, 222. The timestamp value (block 210) will then be divided by 10,000 and the remainder taken, 224. The random() function will then be called by a number of times equal to this remainder determined at block 224, and then the distribution of the last result will be normalized by dividing by 2.147483648 in order to form a session key fragment, 226. As shown at step 228, this key fragment will then be appended to the desired session key, whereupon the previously noted steps 222-228 will be repeated if there are more seeds to handle.

Next, the TERM environment will be prepended with the resultant session key (comprised of the previously generated key fragments) and a colon (step 230) whereupon the standard rlogin command will be executed, 232.

Figure 4:
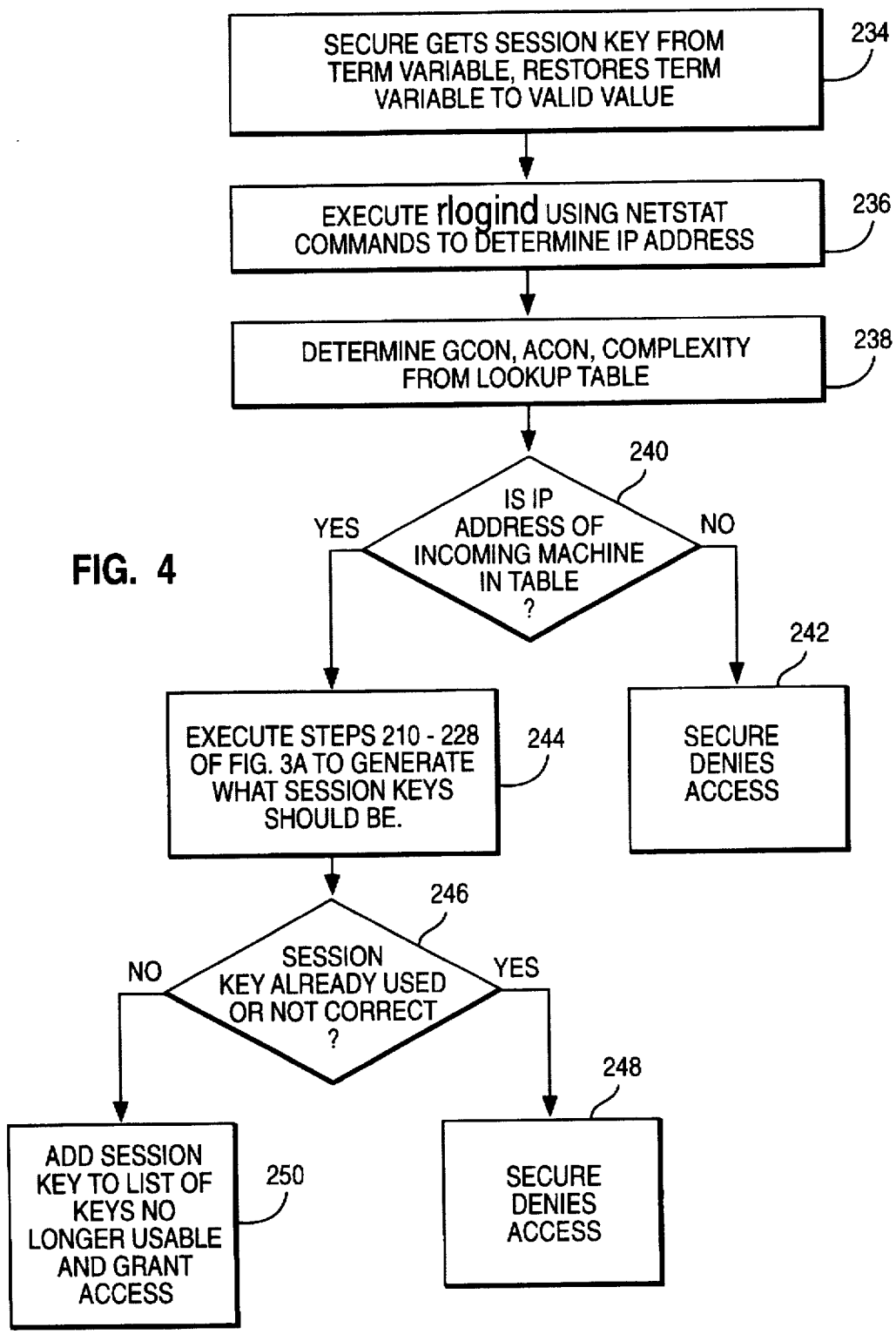
FIG. 4 is a block diagram illustrating the process by which the SECURE machine obtains a session key and either grants or denies access to the TRUSTED machine.

Turning now to FIG. 4, the SECURE machine will obtain the incoming session key from the incoming TERM variable, whereupon SECURE will then remove it to restore the TERM variable to a valid value, 234. In accordance with the invention, a modified version of the login function will be present on the SECURE machine. This login will employ conventional netstat commands in order to determine the incoming Internet Protocol (IP) address, 236 of the machine making the most recent (current) incoming connection. login will also then refer to a lookup table in order to determine specific values for the previously mentioned GCON, ACON, and COMPLEXITY constants, 238, all such constants being specific to the machine with that particular IP address. It will appreciated that these constant values will previously have been communicated by some secure method between the trusted and secure machine owners. This previous step is shown at block 238.

Next, SECURE will determine from the lookup table if the incoming machine's IP address is in the table, 240. If it is not, SECURE denies access, 242. If, on the other hand, the IP address is in the table, then SECURE executes steps 210-228 previously described for each of 11 timestamp values from −5 minutes to +5 minutes to generate what the session keys should be for the incoming machine from−5 minutes to +5 minutes, 244. Next, a determination is made by SECURE as to whether the incoming session key has either already been used before or is not one of the session keys it should be (as determined at step 244), in which case in either event if the key has been used or is not what is expected, SECURE again denies access, 248. On the other hand, if the session key has not already been utilized and is one of the expected keys, this session key will be added to the list of keys no longer usable and access will thereby be granted, 250.

Now that a high level description of the invention with reference to FIGS. 3A, 3B, and 4 has been provided, several more detailed points should be made with respect to certain of the steps detailed therein. First, with respect to step 200-204 FIGS. 3A-3B, it will be appreciated that this feature of employing the same login command for machines either with or without masquerade protection is a valuable feature in essentially providing a transparent user interface accommodating a heterogeneous network of both secure and unsecured machines.

With respect to these blocks 200-204, there is a significant benefit to providing a special version of rlogin which checks to see if the SECURE machine is in fact a SECURE machine. It may not be apparent that this facility protects against what is known in the art as "black box" attacks, where the attacker seeks to gain access by sending identification tokens to his or her own machine for analysis or interception.

Regarding block 208, it should be noted that while a specific form of checksum has been disclosed, the invention is not intended to be so limited. On the contrary, this step may be modified to work on any hardware and generically is simply providing information unique to the particular trusted machine from which a user is seeking to log in. However, depending upon the degree of security desired, the extent of this hardware-specific information is a matter of prudent engineering choice, and the checksum range could be expanded to any input space.

Regarding step 210 in obtaining a value for timestamp, it was noted that the special version of rlogin has precompiled with it GCON, ACON, and COMPLEXITY constants. However, it should be noted that the system could easily have multiple special versions of login such as rlogin1, and rlogin2, each with different such constants. The purpose of so doing is in order to prevent the SECURE 1 machine from masquerading as the TRUSTED machine to the SECURE 2 machine.

Regarding step 226, in the specific implementation disclosed, up to a 45 digit number is created by calling random() "remainder" times. Accordingly the distribution of the last result is normalized by dividing by the specified number in order for the result to range from 0 to 999,999,999. It will be apparent that this range is however a matter of choice. Similarly, with respect to step 224, the constant of 10,000 selected to divide timestamp by is in like manner a matter of choice and need not be 10,000. The value is selected simply to avoid performance problems associated with calling random () by COMPLEXITY × timestamp number of times, although this certainly could be done.

Finally, with respect to block 230, this step is "customized" in order to get the key through a normal rlogin interface (e.g., one without masquerade protection). $TERM is normally passed from rlogin on the originating machine to rlogind on the destination machine. For rsh, the key is prepended to the command, and for a mount such as the network file system (NFS) mount, the key is prepended to the mount point path. Any network interface which passes and receives a character string could thus utilize the same concept as disclosed in the specific embodiment.

Figure 5A:
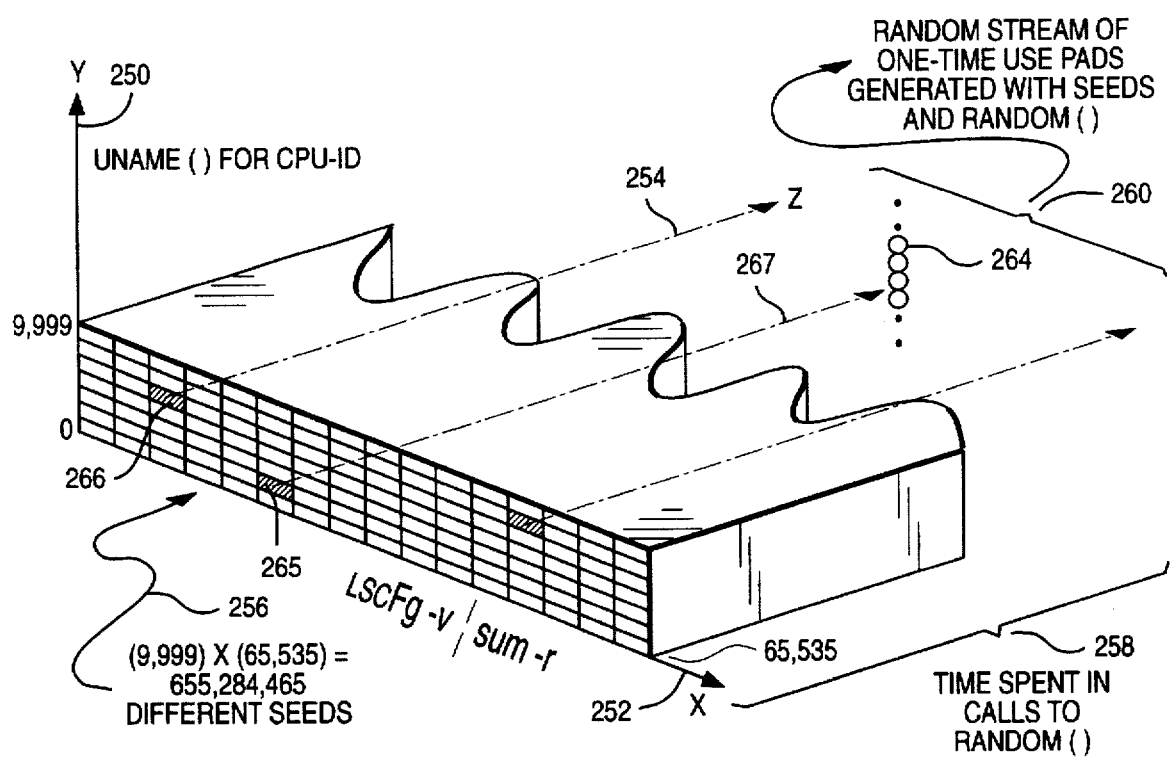
FIG. 5A is a conceptual illustration of principles of the invention particularly relating to the pseudo-random number generation and its use in the SECURE and TRUSTED machines for a complexity of 1.

Turning to FIG. 5A now, a graphic depiction is provided of the operation of the invention in order to more clearly illustrate the fundamental concepts of the invention.

First, a three dimensional graph is provided, having X, Y and Z coordinates, 250, 252, 254, respectively. The ordinant will be recognized as a number corresponding to the CPU-id. In a practical implementation the id may have a range from 0–999, 0–9999,or even 0–99999 for example, dependent upon the particular hardware and corresponding physical CPUs on which the invention operates. The abscissa will be recognized as a continuum of numbers corresponding to the hardware checksum formed by the function lscfg or some appropriate mechanism for generating a hardware-specific checksum. In the implementation, this checksum ranges from 0–65535. The ranges for the X and Y coordinates will be seen to form a rectangular grid 256 comprised of the product of the CPU-id and checksum numbers. This product corresponding to the area of the grid 256 will be recognized as creating a universe of different seeds, in this case 9999×65535 =655,284,465 seeds, each one represented by one of the grid boxes such as box 266. For purposes of this figure, it will be noted that the product of the CPU-id and hardware checksum was chosen to be within the seed space. Accordingly, in this illustration there was no need to adjust the product in the manner shown with respect to steps 211–213 of FIG. 3A to ensure that the product magnitude is within the seed space. In a given system, with a sufficiently large potential maximum value of the CPU-id and/or checksum number, the resulting number may be larger than the seed space in which the case the process of steps 211–213 to adjust the product iteratively so as to come within the seed space value would be effected.

Continuing with FIG. 5A, extending in the Z axis 254 from each of the grid boxes, is a line intended to represent a random stream of one-time use pads generated with its respective seed in the grid from which it originates and the pseudo random function random(). The distance along one of these lines parallel to the Z axis 254 corresponds to the time spent in repeated calls to the random() function as shown by reference numeral 258. This collection of different parallel lines in the Z axis shown by bracket 260 will be comprised of individual lines each emanating from a different one of the grid boxes such as grid box 266, and further representing a stream of numbers generated from a seed in the grid 256 uniquely associated with each such line.

A particular point along one of the lines is shown by a series of circles 264, in this case associated with a particular seed 265, and corresponding stream of numbers generated with this seed, represented as line 267. This series of circles is blown up in the lower part of the figure and is intended to represent, as shown by reference numeral 264 schematically, the 11 locks previously discussed.

Figure 5B:
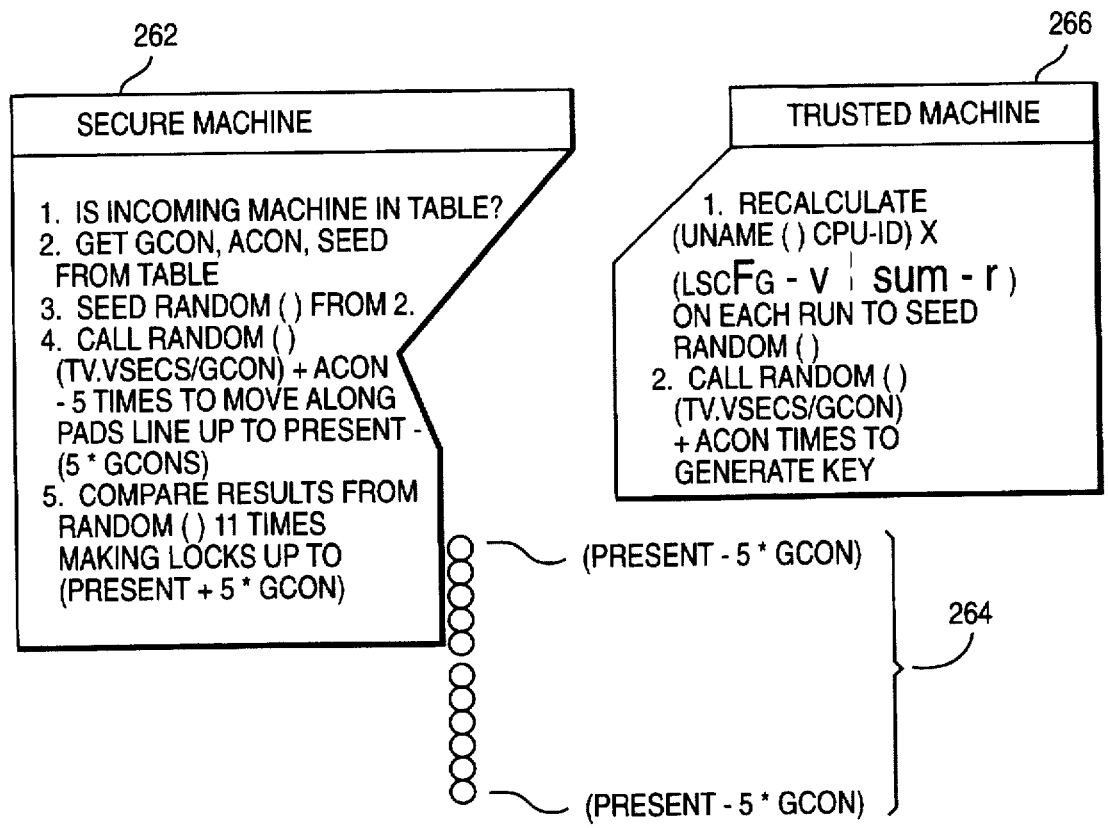
FIG. 5B is an enlarged view of a portion of FIG. 5A.

A table 262, FIG. 5B is shown relating to the SECURE machine which is intended to illustrate the basic high level operations performed by the secure machine in affording the masquerade protection of the invention. Specifically, as previously discussed, the secure machine will first make sure the incoming machine is in its table, shown at the first step "1". Next, the SECURE machine shown in table 262 will utilize this table (readable by root only on the machine) to obtain the previously described GCON, ACON, and seed values from the table, step "2" The SECURE machine next will seed the random() function at step "3" with the values obtained at step 2 and then call the random() function for a prescribed number of times. Specifically random() will be called (tv.vsecs/GCON+ACON-5) numbers of times in order to move along the pads line 267, FIG. 5A up to a value corresponding to the (present–5*GCON), step "4". The results from calling random 11 times will then be compared in order to construct locks up until the present+5*GCON (step "5"), the foregoing being shown by the locks 264, FIG. 5A . As previously pointed out, for each SECURE machine, multiple riogins may be provided if needed in order to ensure that one SECURE machine cannot masquerade as another SECURE machine.

Relative to the TRUSTED machine table 266, FIG. 5B the TRUSTED machine will recalculate the value of the product of the CPU-id times the hardware configuration checksum on each run in order to seed the random() (shown at step 1). Next, the TRUSTED machine 266 will call the random() function by a total of (tv.vsecs/GCON) plus ACON times in order to generate the entire session key.

Figure 6A:
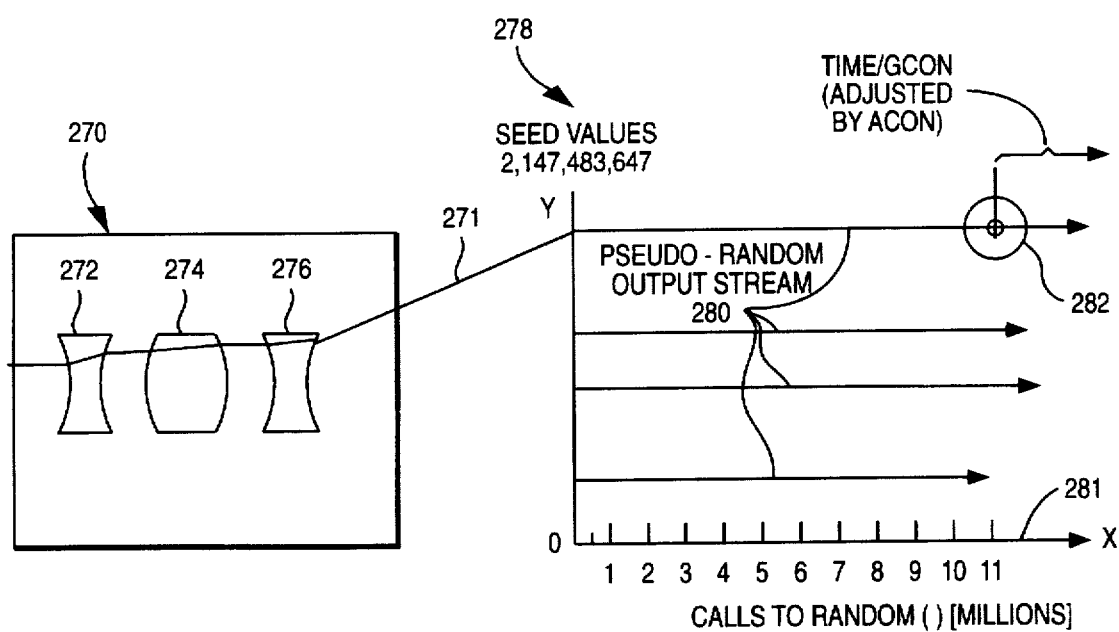
FIG. 6A is another drawing illustrating concepts of the invention including the manner of generating the pseudo-random output stream from differing hardware-dependent seed values, and the use of such stream in generating multiple session keys.

Referring now to FIG. 6A, there is yet another graphical and conceptual representation of key aspects of the invention which, in like manner to FIG. 5A, may assist in their understanding. First, it will be recalled that it is necessary to obtain a hardware value associated with a machine which will thereafter be used as a seed to obtain random numbers which will comprise the session key. In the embodiment shown in FIG. 5A, this collection of seeds was shown as a rectangular plane 256 whose X and Y bounds were defined by the CPU-id and the hardware configuration checksum (LSCFG) although it has already been pointed out that the intention is not intended to be so limited to this particular form of arriving at differing seeds.

Accordingly, in FIG. 6A, this concept has been generalized at box 270, which will be seen to include metaphorically one or more prisms 272–276. Each such prism is intended to only conceptually represent a different scheme for arriving at some form of a hardware-dependent value which may be employed in tandem. It should thus be clear the invention is not intended to be limited to the manner of generating seeds shown in FIG. 5A. The invention admits to virtually any procedure or series of procedures of any degree of complexity desired resulting in a seed value such as that represented by line 271 which may fall within a range of seed values such as that shown in the graph 278 of sufficient magnitude to thwart attempts to compromise the system (the range extending to 2,147,483,647 in the illustration of graph 278).

Figure 6B:
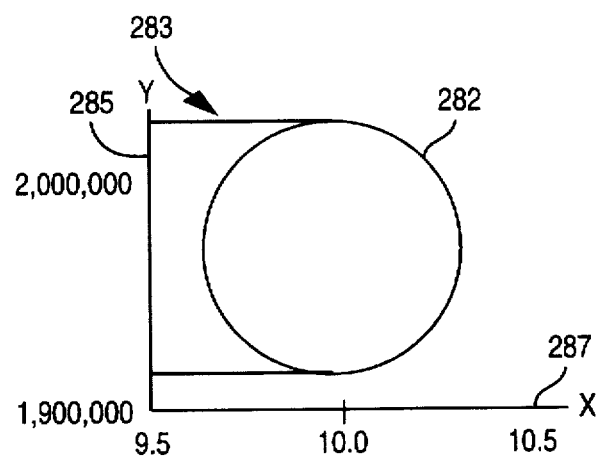
FIG. 6B is an enlarged view of a portion of FIG. 6A.
Figure 6C:
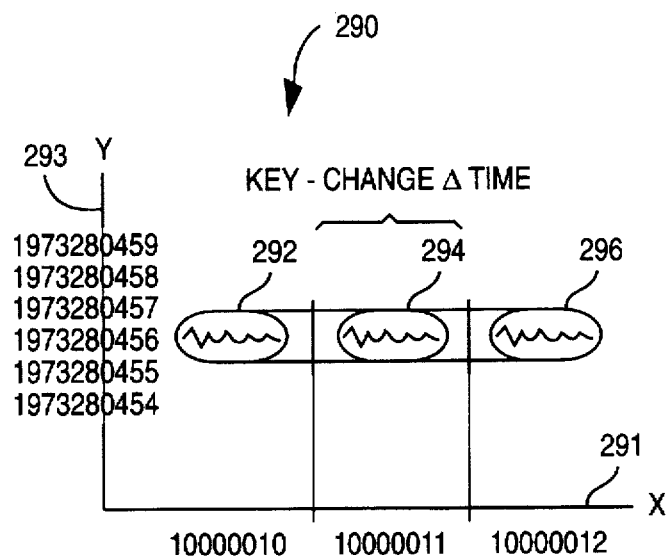
FIG. 6C is an enlarged view of a portion of FIG. 6A

Continuing with FIG. 6A, lines 280 extending horizontally are seen which are intended to graphically illustrate a plurality of pseudo random output streams (such as those of bracket 260 in FIG. 5A. Whereas the ordinant of graph 278 represents possible seed values, the abscissa 281 measures the number of calls to the random() function, also corresponding to a predetermined time divided by the familiar GCON constant and adjusted by ACON. A circle 282 is shown in FIG. 6A and 6B (similar to the locks 264 in FIG. 5A) which, has been blown up and shown on graph 283 having the seed value range as the ordinant 285 and the number of calls to random (in millions) in the abscissa, 287. The graph 290, FIG. 6C has as its Y axis 293 a range of actual seed values from graph 283 which are the actual results of calling random() and as its X axis 291 the seed number. From the foregoing it will be understood that key fragments 292–296 may thereby be generated. It will further be noted that for a complexity of 1,the key fragment 294 would be used as a session key. On the other hand, for complexities greater than 1,these key fragments 292–296 may be fed back as seeds into the method for selecting subsequent key fragments.

It is of course desirable that upon each invocation of the masquerade protected tool for generating session keys that as detailed as possible hardware configuration information be gathered (as conceptually illustrated by the lenses of box 270, FIG. 6A), and then mapped into the seed space of the pseudo random number generator as shown in graph 278 of FIG. 6A, e.g., the random() function ranging, in the described embodiment, from 0–2147483647.

Table 1 which follows illustrates some actual representative key fragment numbers or random() results shown in the columns for differing numbers of calls to random() when random() has been seeded with the seeds shown in the lefthand column which differ in accordance with the particular unique hardware configuration number (such as HW#1 shown in the column). It will be noted that results between result #2 through #10,000,010 have been omitted due obviously to the large number of columns required to show all results. Also, it will be noted from Table 1 that 11 columns of results have been shown for results 10,000,000 through 10,000,010 corresponding to 11 locks previously described.

TABLE 1

| SEED | 1 | 2 | ... 10,000,010 | | |
|---|---|---|---|---|---|
| * 0 * | 1990395451 | 1950343301 | 1467107738 | 718222021 | 1194136672 |
| * 1 * | 2078917053 | 143302914 | 1753184651 | 920128997 | 1814331174 |
| * 2 * | 19955008 | 483746175 | 2039261564 | 1122035973 | 287042027 |
| HW #1 *  845621309 * | 877369427 | 1416513102 | 1393253895 | 1426614629 | 1195827568 |
| HW #2 * 1205769438 * | 990647142 | 1539379435 | 714551448 | 518764677 | 1027266981 |
| HW #3 * 1973280456 * | 269037359 | 1329309741 | 622836706 | 1113596869 | 1974420396 |
| HW #4 * 2147483645 * | 651088819 | 929013518 | 608876999 | 112501903 | 407294992 |
| HW #5 * 2147483646 * | 739610422 | 1269456779 | 894953912 | 314408069 | 1027489493 |
| HW #6 * 2147483647 * | 828132024 | 1609900040 | 1181030825 | 516315045 | 1647683995 |
| .......... | .......... | .......... | .......... | .......... | .......... |
| 1232915785 | 623323901 | 992651780 | 1555095128 | 1491367866 | 150987678 |
| 460770759 | 254862619 | 108788686 | 1850510617 | 318963580 | 280583253 |
| 1836109381 | 2033884984 | 1372409240 | 2145926107 | 1294042941 | 410178829 |
| 819239759 | 325820421 | 1050195750 | 2096250483 | 1631292630 | 1138938711 |
| 1205211789 | 1296342674 | 35938096 | 1493649445 | 1244073863 | 155297983 |
| 75527097 | 196978441 | 310492116 | 1007202948 | 1805898726 | 1319031802 |
| 1401867215 | 654965925 | 1496757414 | 1742590483 | 1787355254 | 835942775 |
| 629722189 | 286504642 | 612894320 | 2038005973 | 614950967 | 965538351 |
| 2005060811 | 2065527008 | 1876514874 | 185937814 | 1590030329 | 1095133926 |
| ,.......... | ...10,000,012 | | | | |
| 2079171784 | 135061501 | | | | |
| 8748332 | 926162679 | | | | |
| 85808529 | 1717263856 | | | | |
| 2136697018 | 2006998385 | | | | |
| 1197237743 | 1801108058 | | | | |
| 1683511884 | 232124393 | | | | |
| 774249370 | 982983441 | | | | |
| 851309567 | 1774084618 | | | | |
| 928369763 | 417702148 | | | | |

Figure 7:
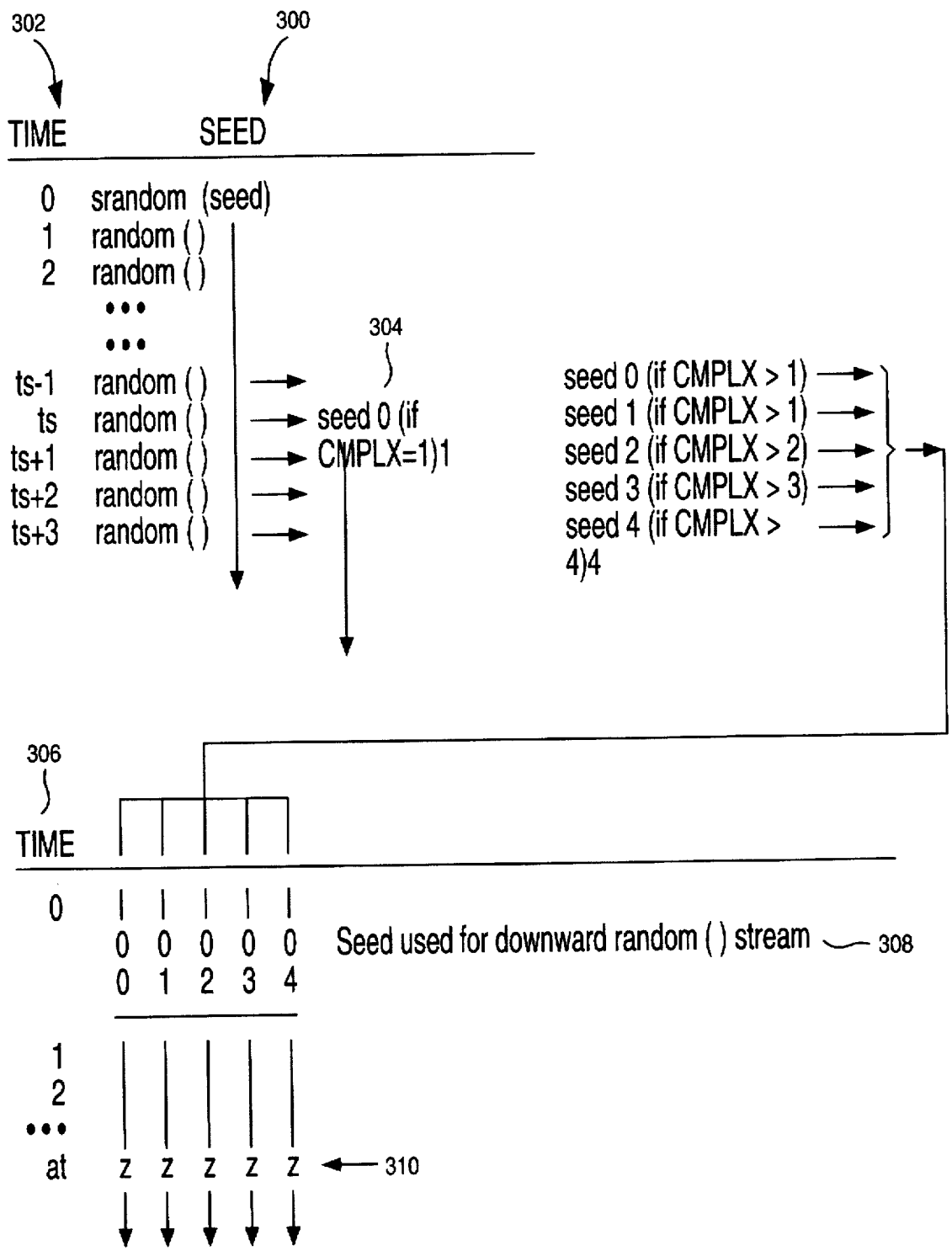
FIG. 7 is a flow diagram illustrating generation of seeds by the TRUSTED machine.

Turning now to FIG. 7, a graphic picture is provided of the sequence of steps for arriving at the session key for complexity 1 (which is the session key), and the adjusted timestamp ("AT") and the corresponding "AT'"TH random results from random() utilized to generate a session key for complexities greater than 1. With respect to the TRUSTED machine, again it will be recalled that hardware specific information is utilized to determine which of the over 2 billion different pseudo random output streams (260 of FIG. 5 for example) will be employed in the initial part of the process.

The confidential GCON and ACON constants it will be recalled affect how far down any pseudo random output stream the process goes to obtain a value. The "seed" 300 in FIG. 7 it will be recalled is the product of the CPU-ID*hardware__checksum, and the timestamp will be recognized as the current time (conventionally the number of seconds past Jan. 1, 1970) /GCON+ACON, abbreviated in FIG. 7 as "TS", 302. Also, the abbreviation CMPLX in FIG. 7 will be recognized to be the familiar COMPLEXITY value constant. For a COMPLEXITY of 1,as previously noted, the ts' th random() result 304, in fact will be the session key. However, if more COMPLEXITY and thus security is desired, for complexities greater than 1, an adjusted timestamp "AT", 306, is formulated, which is the previously described remainder of (timestamp–5)/10000. The seeds 308 are utilized for the downward random() streams, and the results of calling random() corresponding to the "AT" adjusted time (shown, generically, as "ZZZZZ" are the "AT'"TH random results from calling random() after seeding the random number generator with each seed and are used to generate the session keys.

Referring to the SECURE machine now, for a COMPLEXITY of 1,Table 2 shows the 11 calls to random() which could match the session key described with reference to FIG. 7, generated by the TRUSTED machine if the clocks are in the same +/–5GCON range. Again, as per FIG. 7, the timestamp previously described is abbreviated as "TS" and the seed is the value from the table accessible by the secure machine which matches the IP address of the most recent inbound network connection.

TABLE 2

| | | |
|---|---|---|
| 0 | srandom (seed) | |
| 1 | random ( ) | |
| 2 | random ( ) | |
| ... | | |
| ts-5 | random ( ) | could match session key |
| ts-4 | random ( ) | could match session key |
| ts-3 | random ( ) | could match session key |
| ts-2 | random ( ) | could match session key |
| ts-1 | random ( ) | could match session key |
| ts | random ( ) | could match session key |
| ts+1 | random ( ) | could match session key |
| ts+2 | random ( ) | could match session key |
| ts+3 | random ( ) | could match session key |
| ts+4 | random ( ) | could match session key |
| ts+5 | random ( ) | could match session key |

Figure 8:
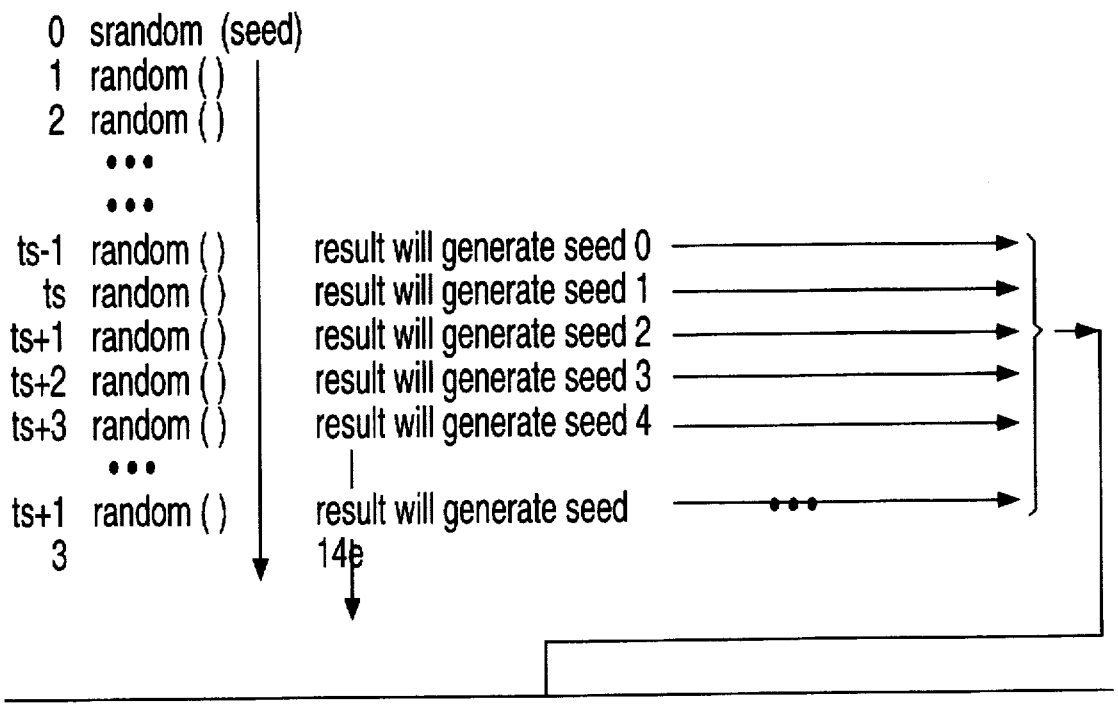
FIG. 8 is a flow diagram illustrating use of a plurality of locks from corresponding multiple seeds.

For the SECURE machine in the case of a designated complexity greater than 1,FIG. 8 provides a graphical illustration of the conditions under which session keys could be matched and further shows that session keys for different time ranges share none of the same building blocks. In FIG. 8, "TC" refers to the clock time of the TRUSTED machine and "SC" refers to the clock time of the SECURE machine. From FIG. 8, it will be noted that if the clocks of the SECURE and TRUSTED machines are in the same GCON seconds range, then FFFFF will be the building blocks for both session keys. However, if the clocks are skewed within a predetermined range, the incoming session key will have been built by one of the following sets of building blocks: AAAAA, BBBBB, CCCCC, DDDDD, EEEEE, GGGGG, HHHHH, IIIII, JJJJJ, or KKKKK.

Finally, in order to better understand the invention, an actual example will be hereinafter provided of a user attempting to rlogin from a machine "crayon" to another machine "S410victim" employing masquerade protection. In the example, an illustration will first be provided wherein session keys do not match and access is denied, followed by a similar example wherein the keys match and access is granted.

First, in accordance with the prior description, a masquerade-protected front end to rlogin will first detect that the S410victim is listed in the etc/hosts.SECURE file, whereupon it collects the previously described CPU-id and checksum of the configuration of the machine currently executing the front end. In the example, the CPU-id will (arbitrarily) be assumed to be 193,and the checksum of LSCFG-V will assumed to be 625. The front end, upon multiplying these numbers together, obtains a seed value of 120625 which obviously will be hardware-specific.

The front end thereafter calls the routine gettimeofday() in order to determine how many seconds have passed since midnight, Jan. 1, 1970. In the example which follows, this function was called on Tuesday, Jun. 27th at 10:35 a.m. CDT, 1995.

The "seconds" value returned by this call to gettimeofday is then divided as previously described by the constant GCON and added to the constant ACON (both, it will be recalled being secret to all "crayon" machine users except for the root user). This is done in order to obtain a value for the "timestamp" variable which depends not only on the date and time, but also the secret values of GCON and ACON previously decided upon by the crayon machine's administrator. The results will be as follows:

gettimeofday() returned 804267329 gettimeofday return +GCON of 37 results in 21736954

ACON of –21473251 is added to the dividend to obtain a timestamp value of 263703

The front end to rlogin will then call srandom(120625) (where 120625 is the hardware-dependent first seed value described above) in order to seed the random number generator.

The random() function is then called "timestamp-2" times, discarding the results generated therefrom which are shown as follows in Table 3:

TABLE 3

| HERE | | |
|---|---|---|
| result from random ( ) call | 1 was | 472515509 |
| result from random ( ) call | 2 was | 1588900722 |
| result from random ( ) call | 3 was | 915019139 |
| result from random ( ) call | 4 was | 1760430670 |
| result from random ( ) call | 5 was | 519503375 |
| result from random ( ) call | 6 was | 556921145 |
| result from random ( ) call | 7 was | 1823984006 |
| result from random ( ) call | 8 was | 1347300635 |
| result from random ( ) call | 9 was | 500795931 |
| result from random ( ) call | 10 was | 702644326 |
| result from random ( ) call | 11 was | 769281827 |
| result from random ( ) call | 12 was | 887862883 |
| result from random ( ) call | 13 was | 1851855625 |
| result from random ( ) call | 14 was | 1292778304 |
| result from random ( ) call | 15 was | 1423281335 |
| .... 263,679 lines of random numbers deleted ... | | |
| result from random ( ) call | 263695 was | 690517059 |
| result from random ( ) call | 263696 was | 2005013007 |
| result from random ( ) call | 263697 was | 518838856 |
| result from random ( ) call | 263698 was | 683953746 |
| result from random ( ) call | 263699 was | 2009848507 |
| result from random ( ) call | 263700 was | 535088599 |
| result from random ( ) call | 263701 was | 729576118 |

Random() is then called COMPLEXITY times (having a value of 4 in this example and known only to crayon's system administrator), with the results being retained as seeds as shown in Table 4:

TABLE 4

| result from random ( ) | call | 263702 was | 109512711 | Assign to seed [1] |
|---|---|---|---|---|
| result from random ( ) | call | 263703 was | 877852427 | Assign to seed [2] |
| result from random ( ) | call | 263704 was | 292077057 | Assign to seed [3] |
| result from random ( ) | call | 263705 was | 761158949 | Assign to seed [4] |

Next, after dividing the timestamp value of 263703 by 10000,the remainder thereof, which is 3703,is utilized wherein random() is called 3703 times in order to generate fragments of session_key (wherein session_key is initialized to null). The results are shown in Table 5 resulting in the session_key shown at the end of the table. The front end to rlogin then prepends the TERM variable, which was "aixterm" with the session key shown at the bottom of Table 5 in order to create a new TERM variable of session_key:aixterm.

TABLE 5

| | | | |
|---|---|---|---:|
| seed [1] = 109512711 | | | |
| result from random ( ) | call | 1 was | 1111472844 |
| result from random ( ) | call | 2 was | 1211763696 |
| result from random ( ) | call | 3 was | 1405547944 |
| result from random ( ) | call | 4 was | 191533680 |
| result from random ( ) | call | 5 was | 1853352561 |
| .... 3,679 lines of random numbers deleted ... | | | |
| result from random ( ) | call | 3700 was | 1701522600 |
| result from random ( ) | call | 3701 was | 3363489348 |
| result from random ( ) | call | 3702 was | 151550372 |
| result from random ( ) | call | 3703 was | 139933611 |
| 139933611 / 2.147483648 is (key fragment) 65161667 | | | |
| after appending fragment, session_key is 65161667 | | | |
| seed [2] = 877852427 | | | |
| result from random ( ) | call | 1 was | 23395926 |
| result from random ( ) | call | 2 was | 2134425828 |
| result from random ( ) | call | 3 was | 1092895110 |
| result from random ( ) | call | 4 was | 81559868 |
| result from random ( ) | call | 5 was | 1299968701 |
| .... 3,679 lines of random numbers deleted ... | | | |
| result from random ( ) | call | 3700 was | 19949398 |
| result from random ( ) | call | 3701 was | 1982066460 |
| result from random ( ) | call | 3702 was | 605740292 |
| result from random ( ) | call | 3703 was | 911460651 |
| 911460651 / 2.147483648 is (key fragment) 424431949 | | | |
| after appending fragment, session_key is 65161667424431949 | | | |
| seed [3] = 292077057 | | | |
| result from random ( ) | call | 1 was | 1385733309 |
| result from random ( ) | call | 2 was | 53438210 |
| result from random ( ) | call | 3 was | 93864347 |
| result from random ( ) | call | 4 was | 1957755326 |
| result from random ( ) | call | 5 was | 1339349887 |
| .... 3,679 lines of random numbers deleted ... | | | |
| result from random ( ) | call | 3700 was | 1007066211 |
| result from random ( ) | call | 3701 was | 673137672 |
| result from random ( ) | call | 3702 was | 1591210132 |
| result from random ( ) | call | 3703 was | 86314347 |
| 86314347 / 2.147483648 is (key fragment) 40193248 | | | |
| after appending fragment, session_key is 6516166742443194940193248 | | | |
| seed [4] = 761158949 | | | |
| result from random ( ) | call | 1 was | 912623767 |
| result from random ( ) | call | 2 was | 836836246 |
| result from random ( ) | call | 3 was | 1995051113 |
| result from random ( ) | call | 4 was | 795444970 |
| result from random ( ) | call | 5 was | 1863667243 |
| .... 3,679 lines of random numbers deleted ... | | | |
| result from random ( ) | call | 3700 was | 527380609 |
| result from random ( ) | call | 3701 was | 1670683728 |
| result from random ( ) | call | 3702 was | 1059892980 |
| result from random ( ) | call | 3703 was | 1476078315 |
| 1476078315 / 2.147483648 is (key fragment) 687352538 | | | |
| after appending fragment, session_key is 6516166742443194940193248687352538 | | | |
| session_key is: 6516166742443194940193248687352538 | | | |

Then the normal (e.g., original) rlogin command is utilized, which transfers the terminal type as part of its normal operation, in order to connect to the S410victim as follows:

crayon__rlogin→(standard rlogin interface)→s410 victim_login

On the S410victim machine, a masquerade-protected version of the "login" function reads the terminal type passed in from the crayon machine, and splits it at the colon, in order to read the incoming <session key> shown in Table 5. The terminal type is then set to its original value of "aixterm". The S410victim machine uses the "netstat" in order to view the IP address of the machine which has most recently started a connection over the network (in the example 129.35.128.113). It also utilizes the "host" command to convert it to a hostname: crayon.austin.ibm.com. The machine then will look up this hostname "crayon.austin.ibm.com" in the etc/security/masqprot.list table in which the following line will be located:

crayon.austin.ibm.com is 129.35.128.113 4 120625 37 −21473251

From this line, the S410victim machine may determine the crayon's constants, namely

| | |
|---|---:|
| COMPLEXITY value: | 4 |
| seed value: | 120625 |
| GCON value: | 37 |
| ACON value: | −21473251 |

The "login front end" then calls the gettimeofday() function to determine how many seconds have passed since midnight, Jan. 1, 1970. It then begins calculating what the incoming session key should be for multiple times centered around the present time, stopping if the incoming key matches the current calculated key. It will be recalled that the "valid time range" concept is necessary to compensate for clock skew and/or clock drift between system clocks on the two machines.

The predetermined number of multiple times is shown as follows in Table 6:

TABLE 6 now − (5* GCON) seconds,
now − (4* GCON) seconds,
now − (3* GCON) seconds,
now − (2* GCON) seconds,
now − ( GCON) seconds,
now,
now + ( GCON) seconds,
now + (2* GCON) seconds,
now + (3* GCON) seconds,
now + (4* GCON) seconds, and
now + (5* GCON) seconds.

If it is assumed that the gettimeofday() function returned a function 804267298,then this result divided by the GCON constant of 37 yields 21736954. Adding the ACON value of −21473251 to this result yields a timestamp value of 263703.

The srandom(120625) function will then be called to seed the random number generator.

TABLE 7

| result from random( ) call | 1 was | 472515509 |
|---|---|---|
| result from random( ) call | 2 was | 1588900722 |
| result from random( ) call | 3 was | 915019139 |
| result from random( ) call | 4 was | 1760430670 |
| result from random( ) call | 5 was | 519503375 |
| result from random( ) call | 6 was | 556921145 |
| result from random( ) call | 7 was | 1823984006 |
| result from random( ) call | 8 was | 1347300635 |
| result from random( ) call | 9 was | 500795831 |
| result from random( ) call | 10 was | 702644326 |
| result from random( ) call | 11 was | 769281827 |
| result from random( ) call | 12 was | 887862883 |
| result from random( ) call | 13 was | 1851855625 |
| result from random( ) call | 14 was | 1292778304 |
| result from random( ) call | 15 was | 1423281335 |

... 263,679 lines of random numbers deleted ...

| result from random( ) call | 263695 was | 690517059 |
|---|---|---|
| result from random( ) call | 263696 was | 2005013007 | then call random( ) (11+COMPLEXITY) times, saving the results as seeds.
Will use:
seeds 0, 1, 2, and 3 to create session key check for now−(5*GCON) seconds,
seeds 1, 2, 3, and 4 to create session key check for now−(4*GCON) seconds,

TABLE 7-continued seeds 2, 3, 4, and 5 to create session key check for now−(3*GCON) seconds,
seeds 3, 4, 5, and 6 to create session key check for now−(2*GCON) seconds,
seeds 4, 5, 6, and 7 to create session key check for now−( GCON) seconds,
seeds 5, 6, 7, and 8 to create session key check for now,
seeds 6, 7, 8, and 9 to create session key check for now+( GCON) seconds,
seeds 7, 8, 9, and 10 to create session key check for now+(2*GCON) seconds,
seeds 8, 9, 10, and 11 to create session key check for now+(3*GCON) seconds,
seeds 9, 10, 11, and 12 to create session key check for now+(4*GCON) seconds,
seeds 10, 11, 12, and 13 to create session key check for now+(5*GCON) seconds,
result from random( ) call 263697 was 518838856 Assign to seed[0]
result from random( ) call 263698 was 683953746 Assign to seed[1]
result from random( ) call 263699 was 2009848507 Assign to seed[2]
result from random( ) call 263700 was 535088599 Assign to seed[3]
result from random( ) call 263701 was 729576118 Assign to seed[4]
result from random( ) call 263702 was 109512711 Assign to seed[5]
result from random( ) call 263703 was 877852427 Assign to seed[6]
result from random( ) call 263704 was 292077057 Assign to seed[7]
result from random( ) call 263705 was 761158949 Assign to seed[8]
result from random( ) call 263706 was 898090332 Assian to seed[9]
result from random( ) call 263707 was 1328262702 Assign to seed[10]
result from random( ) call 263708 was 1700051705 Assigm to seed[11]
result from random( ) call 263709 was 1049723143 Assign to seed[12]
result from random( ) call 263710 was 1977441982 Assign to seed[13]
result from random( ) call 263711 was 360217799 Assign to seed[14]

With a timestamp of 263703,the remainder of timestamp after being divided by 10000 is 3703.

The session_key is then initialized to null, and different length random() strings are utilized for each session key.

For a session_key # of 0,wherein the timestamp is 63703,this timestamp −5 is 263698 which, after adding the aforementioned session key # of 0,still results in 63698. The remainder of this 263698 value, after dividing by 10000 is 3698.

This value of 3698 is then used in order to call random() 3698 times in order to generate fragments of session—key [0] as shown in Table 8:

TABLE 8 seed [0] = 518838856

| result from random ( ) | call | 1 was | 1434641391 |
|---|---|---|---|
| result from random ( ) | call | 2 was | 1785492909 |
| result from random ( ) | call | 3 was | 247519584 |
| result from random ( ) | call | 4 was | 430401955 |
| result from random ( ) | call | 5 was | 302823428 |

.... 3,679 lines of random numbers deleted ...

| result from random ( ) | call | 3695 was | 688574576 |
|---|---|---|---|
| result from random ( ) | call | 3696 was | 1592424908 |
| result from random ( ) | call | 3697 was | 314425712 |
| result from random ( ) | call | 3698 was | 476900761 |

476900761 / 2.147483648 is (key fragment) 222074225
after appending fragment, session_key is 222074225
seed [1] = 683953746

| result from random ( ) | call | 1 was | 676780296 |
|---|---|---|---|
| result from random ( ) | call | 2 was | 579575439 |
| result from random ( ) | call | 3 was | 16909259 |
| result from random ( ) | call | 4 was | 997224993 |
| result from random ( ) | call | 5 was | 733048898 |

.... 3,679 lines of random numbers deleted ...

| result from random ( ) | call | 3695 was | 1597753697 |
|---|---|---|---|
| result from random ( ) | call | 3696 was | 1724422159 |
| result from random ( ) | call | 3697 was | 1902719308 |

TABLE 8-continued

| | | | |
|---|---|---|---|
| result from random ( ) | call | 3698 was | 1597503509 |

1597503509 / 2.147483648 is (key fragment) 743895530
after appending fragment, session_key is 222074225743895530
seed [2] = 2009848507

| | | | |
|---|---|---|---|
| result from random ( ) | call | 1 was | 1727438734 |
| result from random ( ) | call | 2 was | 753135060 |
| result from random ( ) | call | 3 was | 1692929070 |
| result from random ( ) | call | 4 was | 532384076 |
| result from random ( ) | call | 5 was | 2057764045 |
| . . . . 3,679 lines of random numbers deleted . . . | | | |
| result from random ( ) | call | 3695 was | 1606094916 |
| result from random ( ) | call | 3696 was | 2048751823 |
| result from random ( ) | call | 3697 was | 1560585170 |
| result from random ( ) | call | 3698 was | 818799147 |

818799147 / 2.147483648 is (key fragment) 381283074
after appending fragment, session_key is 222074225743895530381283074
seed [3] = 535088599

| | | | |
|---|---|---|---|
| result from random ( ) | call | 1 was | 1458307412 |
| result from random ( ) | call | 2 was | 1837081216 |
| result from random ( ) | call | 3 was | 1719654976 |
| result from random ( ) | call | 4 was | 2083499744 |
| result from random ( ) | call | 5 was | 428909089 |
| . . . . 3,679 lines of random numbers deleted . . . | | | |
| result from random ( ) | call | 3695 was | 42425754 |
| result from random ( ) | call | 3696 was | 1625346673 |
| result from random ( ) | call | 3697 was | 573973050 |
| result from random ( ) | call | 3698 was | 1800572499 |

1800572499 / 2.147483648 is (key fragment) 838456928
after appending fragment, session_key is 222074225743895530381283074838456928
session_key [0] : 222074225743895530381283074838456928
does not match: 6516166742443194940193248687352538    the incoming key.

As also shown at the end of Table 8, the session—key [O] does not match the incoming key.

Again, the session_key is initialized to null, and different length random() streams are utilized for each session key, with the session key # now being 1.

Similarly to previously, with a timestamp of 263703, this value −5 is 263698, which after adding the session key "1" becomes 263699.

The remainder of 263699, after dividing by 10000 is 3699.

The random() function is then called 3699 times in order to generate fragments for session_key[1] as shown in Table 9:

TABLE 9 seed [1] = 683953746

| | | | |
|---|---|---|---|
| result from random ( ) | call | 1 was | 676780296 |
| result from random ( ) | call | 2 was | 579575439 |
| result from random ( ) | call | 3 was | 16909259 |
| result from random ( ) | call | 4 was | 997224993 |
| result from random ( ) | call | 5 was | 733048898 |
| . . . . 3,679 lines of random numbers deleted . . . | | | |
| result from random ( ) | call | 3696 was | 1724422159 |
| result from random ( ) | call | 3697 was | 1902719308 |
| result from random ( ) | call | 3698 was | 1597503509 |
| result from random ( ) | call | 3699 was | 812713069 |

812713069 / 2.147483648 is (key fragment) 378449022
after appending fragment, session_key is 378449022
seed [2] = 2009848507

| | | | |
|---|---|---|---|
| result from random ( ) | call | 1 was | 1727438734 |
| result from random ( ) | call | 2 was | 753135060 |
| result from random ( ) | call | 3 was | 1692929070 |
| result from random ( ) | call | 4 was | 532384076 |
| result from random ( ) | call | 5 was | 2057764045 |
| . . . . 3,679 lines of random numbers deleted . . . | | | |
| result from random ( ) | call | 3696 was | 2048751823 |
| result from random ( ) | call | 3697 was | 1560585170 |
| result from random ( ) | call | 3698 was | 818799147 |
| result from random ( ) | call | 3699 was | 841898830 |

841898830 / 2.147483648 is (key fragment) 392039686
after appending fragment, session_key is 378449022392039686
seed [3] = 535088599

| | | | |
|---|---|---|---|
| result from random ( ) | call | 1 was | 1458307412 |
| result from random ( ) | call | 2 was | 1837081216 |
| result from random ( ) | call | 3 was | 1719654976 |
| result from random ( ) | call | 4 was | 2083499744 |
| result from random ( ) | call | 5 was | 428709089 |

TABLE 9-continued

| .... 3,679 lines of random numbers deleted ... | | | |
|---|---|---|---|
| result from random ( ) | call | 3696 was | 1625346673 |
| result from random ( ) | call | 3697 was | 573973050 |
| result from random ( ) | call | 3698 was | 1800572499 |
| result from random ( ) | call | 3699 was | 276142892 |
| 276142892 / 2.147483648 is (key fragment) 128589048 | | | |
| after appending fragment, session_key is 378449022392039686128589048 | | | |
| seed [4] = 729576118 | | | |
| result from random ( ) | call | 1 was | 1965191682 |
| result from random ( ) | call | 2 was | 1722311523 |
| result from random ( ) | call | 3 was | 1326087673 |
| result from random ( ) | call | 4 was | 689429261 |
| result from random ( ) | call | 5 was | 1464874670 |
| .... 3,679 lines of random numbers deleted ... | | | |
| result from random ( ) | call | 3696 was | 1007954093 |
| result from random ( ) | call | 3697 was | 958461924 |
| result from random ( ) | call | 3698 was | 125929709 |
| result from random ( ) | call | 3699 was | 2002160207 |
| 2002160207 / 2.147483648 is (key fragment) 932328522 | | | |
| after appending fragment, session_key is 378844902239203968612858889000048932328522 | | | |
| session_key [1] : 378449022392039686128589048932328522 | | | |
| does not match: 6516166742443194940193248687352538   the incoming key | | | |

Again, at the end of Table 9,the session_key [1] does not match the incoming key.

Continuing with the example, with a remainder of 3700, calling random() 3700 times, to generate fragments of session_key[2], as shown in Table 10,results in the session_key[2] which does not match the incoming key. Similarly, calling random() 3700 times to generate fragments of session_key[3] results in the session_key [3] in the manner shown in Table 11 which also does not match the incoming key.

TABLE 10

| seed [2] = 2009848507 | | | |
|---|---|---|---|
| result from random ( ) | call | 1 was | 1727438734 |
| result from random ( ) | call | 2 was | 753135060 |
| result from random ( ) | call | 3 was | 1692929070 |
| result from random ( ) | call | 4 was | 532384076 |
| result from random ( ) | call | 5 was | 2057764045 |
| .... 3,679 lines of random numbers deleted ... | | | |
| result from random ( ) | call | 3697 was | 1560585170 |
| result from random ( ) | call | 3698 was | 818799147 |
| result from random ( ) | call | 3699 was | 841898830 |
| result from random ( ) | call | 3700 was | 757516734 |
| 757516734 / 2.147483648 is (key fragment) 352746218 | | | |
| after appending fragment, session_key is 352746218 | | | |
| seed [3] = 535088599 | | | |
| result from random ( ) | call | 1 was | 1458307412 |
| result from random ( ) | call | 2 was | 1837081216 |
| result from random ( ) | call | 3 was | 1719654976 |
| result from random ( ) | call | 4 was | 2083499744 |
| result from random ( ) | call | 5 was | 428709089 |
| .... 3,679 lines of random numbers deleted ... | | | |
| result from random ( ) | call | 3697 was | 573973050 |
| result from random ( ) | call | 3698 was | 1800572499 |
| result from random ( ) | call | 3699 was | 276142892 |
| result from random ( ) | call | 3700 was | 1746184064 |
| 1746184064 / 2.147483648 is (key fragment) 813130319 | | | |
| after appending fragment, session_key is 352746218813130319 | | | |
| seed [4] = 729576118 | | | |
| result from random ( ) | call | 1 was | 1965191682 |
| result from random ( ) | call | 2 was | 1722311523 |
| result from random ( ) | call | 3 was | 1326087673 |
| result from random ( ) | call | 4 was | 689429261 |
| result from random ( ) | call | 5 was | 1464874670 |
| .... 3,679 lines of random numbers deleted ... | | | |
| result from random ( ) | call | 3697 was | 958461924 |
| result from random ( ) | call | 3698 was | 125929709 |
| result from random ( ) | call | 3699 was | 2002160207 |
| result from random ( ) | call | 3700 was | 2128166917 |
| 2128166917 / 2.147483648 is (key fragment) 991004943 | | | |
| after appending fragment, session_key is 352746218813130319991004943 | | | |
| seed [5] = 109512711 | | | |
| result from random ( ) | call | 1 was | 1111472844 |
| result from random ( ) | call | 2 was | 1211763696 |
| result from random ( ) | call | 3 was | 1405547944 |

TABLE 10-continued

| result from random ( ) | call | 4 was | 191533680 |
|---|---|---|---|
| result from random ( ) | call | 5 was | 1853352561 |
| .... 3,679 lines of random numbers deleted ... | | | |
| result from random ( ) | call | 3697 was | 208480858 |
| result from random ( ) | call | 3698 was | 1813571955 |
| result from random ( ) | call | 3699 was | 1705903748 |
| result from random ( ) | call | 3700 was | 1701522600 |

1701522600 / 2.147483648 is (key fragment) 792333185
after appending fragment, session_key is 35274621881313031999100494 3792333185
session_key [2] : 35274621881313031999100494 3792333185
does not match: 6516166742443194940193248687352538    the incoming key.

With a remainder of 3701 and a call random(3701) results in session_key[3] which does not match the incoming key as shown in Table 11:

TABLE 11

| seed [3] = 535088599 | | | |
|---|---|---|---|
| result from random ( ) | call | 1 was | 1458307412 |
| result from random ( ) | call | 2 was | 1837081216 |
| result from random ( ) | call | 3 was | 1719654976 |
| result from random ( ) | call | 4 was | 2083499744 |
| result from random ( ) | call | 5 was | 428709089 |
| .... 3,679 lines of random numbers deleted ... | | | |
| result from random ( ) | call | 3968 was | 1800572499 |
| result from random ( ) | call | 3699 was | 276142892 |
| result from random ( ) | call | 3700 was | 1746184064 |
| result from random ( ) | call | 3701 was | 1104894644 |
| 1104894644 / 2.147483648 is (key fragment) 514506638 | | | |
| after appending fragment, session_key is 514506638 | | | |
| seed [4] = 729576118 | | | |
| result from random ( ) | call | 1 was | 1965191682 |
| result from random ( ) | call | 2 was | 1722311523 |
| result from random ( ) | call | 3 was | 1326087673 |
| result from random ( ) | call | 4 was | 689429261 |
| result from random ( ) | call | 5 was | 1464874670 |
| .... 3,679 lines of random numbers deleted ... | | | |
| result from random ( ) | call | 3698 was | 125929709 |
| result from random ( ) | call | 3699 was | 2002160207 |
| result from random ( ) | call | 3700 was | 2128166917 |
| result from random ( ) | call | 3701 was | 1964392946 |
| 1964392946 / 2.147483648 is (key fragment) 914741754 | | | |
| after appending fragment, session_key is 514506638914741754 | | | |
| seed [5] = 109512711 | | | |
| result from random ( ) | call | 1 was | 1111472844 |
| result from random ( ) | call | 2 was | 1211763696 |
| result from random ( ) | call | 3 was | 1405547944 |
| result from random ( ) | call | 4 was | 191533680 |
| result from random ( ) | call | 5 was | 1853352561 |
| .... 3,679 lines of random numbers deleted ... | | | |
| result from random ( ) | call | 3698 was | 1813571955 |
| result from random ( ) | call | 3699 was | 1705903748 |
| result from random ( ) | call | 3700 was | 1701522600 |
| result from random ( ) | call | 3701 was | 336348948 |
| 336348948 / 2.147483648 is (key fragment) 156624689 | | | |
| after appending fragment, session_key is 514506638914741754156624689 | | | |
| result from random ( ) | call | 3698 was | 1813571955 |
| result from random ( ) | call | 3699 was | 1705903748 |
| result from random ( ) | call | 3700 was | 1701522600 |
| result from random ( ) | call | 3701 was | 336348948 |
| 336348948 / 2.147483648 is (key fragment) 156624689 | | | |
| after appending fragment, session_key is 514506638914741754 1566246989 | | | |
| seed [6] = 877852427 | | | |
| result from random ( ) | call | 1 was | 23395926 |
| result from random ( ) | call | 2 was | 2134425828 |
| result from random ( ) | call | 2 was | 1092895110 |
| result from random ( ) | call | 4 was | 81559868 |
| result from random ( ) | call | 5 was | 1299968701 |
| .... 3,679 lines of random numbers deleted ... | | | |
| result from random ( ) | call | 2698 was | 1902157323 |
| result from random ( ) | call | 3699 was | 2134640950 |
| result from random ( ) | call | 3700 was | 199493398 |
| result from random ( ) | call | 3710 was | 1982066460 |
| 1982066460 / 2.147483648 is (key fragment) 9229712606 | | | |
| after appending fragment, session_key is 5145066389147417541566246899229 71606 | | | |

TABLE 11-continued session_key [3] : 51450663891474175415662468992297160606
does not match: 65161667424431994940193248687352538     the incoming key.

Continuing this process with a call to random() 3702 times, results in session_key [4] which does not match the incoming key, as shown in Table 12:

TABLE 12 seed [4] = 729576118
| | | | |
|---|---|---|---|
| result from random ( ) | call | 1 was | 1965191682 |
| result from random ( ) | call | 2 was | 1722311523 |
| result from random ( ) | call | 3 was | 1326087673 |
| result from random ( ) | call | 4 was | 689429261 |
| result from random ( ) | call | 5 was | 1464874670 |

.... 3,679 lines of random numbers deleted ...
| | | | |
|---|---|---|---|
| result from random ( ) | call | 3699 was | 2002160207 |
| result from random ( ) | call | 3700 was | 2028166917 |
| result from random ( ) | call | 3701 was | 1964392946 |
| result from random ( ) | call | 3702 was | 1028288332 |

1028288332 / 2.147483648 is (key fragment) 478834062
after appending fragment, session_key is 478834062
seed [5] = 109512711
| | | | |
|---|---|---|---|
| result from random ( ) | call | 1 was | 2511472844 |
| result from random ( ) | call | 2 was | 1211763696 |
| result from random ( ) | call | 3 was | 1405547944 |
| result from random ( ) | call | 4 was | 191533680 |
| result from random ( ) | call | 5 was | 1853352561 |

.... 3,679 lines of random numbers deleted ...
| | | | |
|---|---|---|---|
| result from random ( ) | call | 3699 was | 1705903748 |
| result from random ( ) | call | 3700 was | 1701522600 |
| result from random ( ) | call | 3701 was | 336348948 |
| result from random ( ) | call | 3702 was | 151550372 |

151550372 / 2.147483648 is (key fragment) 70571139
after appending fragment, session_key is 47883406270571139
seed [6] = 877852427
| | | | |
|---|---|---|---|
| result from random ( ) | call | 1 was | 23395926 |
| result from random ( ) | call | 2 was | 2134425828 |
| result from random ( ) | call | 3 was | 1092895110 |
| result from random ( ) | call | 4 was | 81559868 |
| result from random ( ) | call | 5 was | 1299968701 |

.... 3,679 lines of random numbers deleted ...
| | | | |
|---|---|---|---|
| result from random ( ) | call | 3699 was | 2134640950 |
| result from random ( ) | call | 3700 was | 19949398 |
| result from random ( ) | call | 3701 was | 1982066460 |
| result from random ( ) | call | 3702 was | 605740292 |

605740292 / 2.147483648 is (key fragment) 282069802
after appending fragment, session_key is 47883406270571139282069802
seed [7] = 292077057
| | | | |
|---|---|---|---|
| result from random ( ) | call | 1 was | 1385733309 |
| result from random ( ) | call | 2 was | 53438210 |
| result from random ( ) | call | 3 was | 93864347 |
| result from random ( ) | call | 4 was | 1957755326 |
| result from random ( ) | call | 5 was | 1339349887 |

.... 3,679 lines of random numbers deleted ...
| | | | |
|---|---|---|---|
| result from random ( ) | call | 3699 was | 1067583161 |
| result from random ( ) | call | 3700 was | 1007066211 |
| result from random ( ) | call | 3701 was | 673137672 |
| result from random ( ) | call | 3702 was | 1591210132 |

1591210132 / 2.147483648 is (key fragment) 740964949
after appending fragment, session_key is 47883406270571139282069802740964949
session_key [4] : 47883406270571139282069802740964949
does not match: 65161667424431994940193248687352538     the incoming key.

However, with respect to Table 13, calling random() 3703 times generates a session_key [5] which, as desired, finally matches the incoming key.

TABLE 13

| seed [5] = 109512711 | | | |
|---|---|---|---|
| result from random ( ) | call | 1 was | 1111472844 |
| result from random ( ) | call | 2 was | 1211763696 |
| result from random ( ) | call | 3 was | 1405547944 |
| result from random ( ) | call | 4 was | 191533680 |
| result from random ( ) | call | 5 was | 1853352561 |
| . . . . 3,679 lines of random numbers deleted . . . | | | |
| result from random ( ) | call | 3700 was | 1701522600 |
| result from random ( ) | call | 3701 was | 336348948 |
| result from random ( ) | call | 3702 was | 151550372 |
| result from random ( ) | call | 3703 was | 139933611 |
| 139933611 / 2.147483648 is (key fragment) 65161667 | | | |
| after appending fragment, session_key is 65161667 | | | |
| seed [6] = 877852427 | | | |
| result from random ( ) | call | 1 was | 23395926 |
| result from random ( ) | call | 2 was | 2134425828 |
| result from random ( ) | call | 3 was | 1092895110 |
| result from random ( ) | call | 4 was | 81559868 |
| result from random ( ) | call | 5 was | 1299968701 |
| . . . . 3,679 lines of random numbers deleted . . . | | | |
| result from random ( ) | call | 3700 was | 19949398 |
| result from random ( ) | call | 3701 was | 1982066460 |
| result from random ( ) | call | 3702 was | 605740292 |
| result from random ( ) | call | 3703 was | 911460651 |
| 911460651 / 2.147483648 is (key fragment) 424431949 | | | |
| after appending fragment, session_key is 65161667424431949 | | | |
| seed [7] = 292077057 | | | |
| result from random ( ) | call | 1 was | 1385733309 |
| result from random ( ) | call | 2 was | 53438210 |
| result from random ( ) | call | 3 was | 93864347 |
| result from random ( ) | call | 4 was | 1957755326 |
| result from random ( ) | call | 5 was | 1339349887 |
| . . . . 3,679 lines of random numbers deleted . . . | | | |
| result from random ( ) | call | 3700 was | 1007066211 |
| result from random ( ) | call | 3701 was | 673137672 |
| result from random ( ) | call | 3702 was | 1591210132 |
| result from random ( ) | call | 3703 was | 86314347 |
| 86314347 / 2.147483648 is (key fragment) 40193248 | | | |
| after appending fragment, session_key is 6516166742443194940193248 | | | |
| seed [8] = 761158949 | | | |
| result from random ( ) | call | 1 was | 912623767 |
| result from random ( ) | call | 2 was | 836836246 |
| result from random ( ) | call | 3 was | 1995051113 |
| result from random ( ) | call | 4 was | 795444970 |
| result from random ( ) | call | 5 was | 1863667243 |
| . . . . 3,679 lines of random numbers deleted . . . | | | |
| result from random ( ) | call | 3700 was | 527380609 |
| result from random ( ) | call | 3701 was | 1670683728 |
| result from random ( ) | call | 3702 was | 1059892980 |
| result from random ( ) | call | 3703 was | 1476078315 |
| 1476078315 / 2.147483648 is (key fragment) 687352538 | | | |
| after appending fragment, session_key is 6516166742443194940193248687352538 | | | |
| session_key [5] : 6516166742443194940193248687352538 | | | |
| EXACTLY MATCHES: 6516166742443194940193248687352538 | | | the incoming key! |

Next, the S410victim machine will scan the /var/tmp/masqkeys file to see if the resulting key from Table 13 has been used before. If it has been, the S410victim machine would deny access. However, this check of the file indicates the key has not yet been utilized. Accordingly, the S410victim machine will then append this key and a timestamp to /var/tmp/masqkeys.used as follows:

65161666742443194940193248687352538 Tue_Jun_27_10:35:20_CDT_1995, and thereafter grants the desired access.

While the invention has been shown and described with reference to particular embodiments thereof, it will be understood by those skilled in the art that the foregoing and other changes in form and detail may be made therein without departing from the spirit and scope of the invention.

I claim:

1. A method for providing masquerade protection in a computer network, comprising:

executing a one way hash function having an output space with guaranteed output space duplicates, comprising:
seeding a pseudo random number generator function with a number corresponding to said one or more hardware characteristics; and wherein said session key is generated from a number generated from said seeded pseudo random number generator function;

generating a session key with a first machine as a function of a timestamp and one or more hardware characteristics unique to said first machine;

transmitting said session key over said network from said first machine through intermediate machines without said masquerade protection to said second machine;

generating a plurality of locks with said second machine as a function of said timestamp and said hardware characteristics;

testing with said second machine whether said session key matches one of said plurality of locks; and granting access from said first machine to said second machine when said session key matches said one of said plurality of locks.

2. The method of claim 1 wherein said session key is valid for a predetermined time functionally related to said timestamp.

3. The method of claim 2 wherein said hardware characteristics include a central processing unit identification number associated with a central processor unit in said first machine.

4. The method of claim 3 wherein said hardware characteristics include a checksum determined from multiple hardware aspects of said first machine.

5. The method of claim 4 wherein said session key is a function of a product of said central processor unit identification number and said checksum.

6. The method of claim 1 further including maintaining with said second machine a list of previously used said session keys; and wherein said method further includes testing whether said session key is on said list, and, if so, inhibiting said testing of whether said session key matches said one of said plurality of locks, and denying access.

7. The method of claim 1 including specifying at said first and second machines a COMPLEXITY number corresponding to a desired level of said masquerade protection; and wherein said pseudo random number generator function is seeded a number of times corresponding to said complexity number.

8. The method of claim 1 further including maintaining on said second machine a list of machines on said network which have said masquerade protection and may be granted access to said second machine;

wherein said transmitting occurs at a time corresponding to a timestamp generated with said first machine; and wherein said list includes a network address, and information for generating said time with said second machine.

9. The method of claim 8 further including maintaining on said first machine a list of machines on said network to which said first machine will permit said session keys to be sent; and preventing said transmitting of said session key to said second machine when said second machine is not on said list on said first machine.

10. An apparatus for providing masquerade protection in a computer network, comprising:

means for executing a one way hash function having an output space with guaranteed output space duplicates, comprising:

means for seeding a pseudo random number generator function with a number corresponding to said one or more hardware characteristics; and wherein said session key is generated from a number generated from said seeded pseudo random number generator function;

means for generating a session key with a first machine as a function of a timestamp and one or more hardware characteristics unique to said first machine;

means for transmitting said session key over said network from said first machine through intermediate machines without said masquerade protection to said second machine;

means for generating a plurality of locks with said second machine as a function of said timestamp and said hardware characteristics;

means for testing with said second machine whether said session key matches one of said plurality of locks; and means for granting access from said first machine to said second machine when said session key matches said one of said plurality of locks.

11. The apparatus of claim 10 wherein said session key is valid for a predetermined time functionally related to said timestamp.

12. The apparatus of claim 11 wherein said hardware characteristics include a central processing unit identification number associated with a central processor unit in said first machine.

13. The apparatus of claim 12 wherein said hardware characteristics include a checksum determined from multiple hardware aspects of said first machine.

14. The apparatus of claim 13 wherein said session key is a function of a product of said central processor unit identification number in said checksum.

15. The apparatus of claim 10 further including means for maintaining with said second machine a list of previously used said session keys; and wherein said apparatus further includes means for testing whether said session key is on said list, and, if so, inhibiting said testing of whether said session key matches said one of said plurality of locks, and denying access.

16. The apparatus of claim 10 including means for specifying at said first and second machines a COMPLEXITY number corresponding to a desired level of said masquerade protection; and wherein said pseudo random number generator function is seeded a number of times corresponding to said complexity number.

17. The apparatus of claim 10 further including means for maintaining on said second machine a list of machines on said network which have said masquerade protection and may be granted access to said second machine;

wherein said transmitting occurs at a time corresponding to a timestamp generated with said first machine; and wherein said list includes a network address, and information for generating said time with said second machine.

18. The apparatus of claim 17 further including means for maintaining on said first machine a list of machines on said network to which said first machine will permit said session keys to be sent; and means for preventing said transmitting of said session key to said second machine when said second machine is not on said list on said first machine.

* * * * *